United States Patent [19]

Balamuth et al.

[11] E Re. 28,752

[45] Reissued Mar. 30, 1976

[54] ULTRASONIC KITS AND MOTOR SYSTEMS

[75] Inventors: Lewis Balamuth, New York; Arthur Kuris, Riverdale; Manual Karatjas, Glen Oaks, all of N.Y.

[73] Assignee: Ultrasonic Systems, Inc., Farmingdale, N.Y.

[22] Filed: Jan. 27, 1975

[21] Appl. No.: 544,134

Related U.S. Patent Documents

Reissue of:

[64] Patent No.: 3,809,977
Issued: May 7, 1974
Appl. No.: 119,298
Filed: Feb. 26, 1971

[52] U.S. Cl. ..... 318/116; 32/58; 128/24 A; 206/223

[51] Int. Cl.[2] ..... H01V 7/00

[58] Field of Search ..... 310/8.1, 26; 318/116, 118; 15/22; 32/56, 58, 28, DIG. 9; 128/24 A; 206/16 R, 16 S, 17, 172, 172 A; 228/1

[56] References Cited

UNITED STATES PATENTS

| | | | |
|---|---|---|---|
| 591,160 | 10/1897 | Dow | 128/172.1 |
| 2,846,874 | 8/1958 | Horn | 310/8.1 X |
| 2,874,470 | 2/1959 | Richards | 128/24 A |
| 2,917,691 | 12/1959 | DePrisco et al. | 318/118 |
| 3,176,167 | 3/1965 | Vosseler | 310/8.1 |
| 3,368,280 | 2/1968 | Friedman et al. | 310/26 X |
| 3,375,583 | 4/1968 | Blank et al. | 310/26 X |
| 3,427,480 | 2/1969 | Robinson | 310/8.1 |
| 3,432,691 | 3/1969 | Shoh | 318/118 X |
| 3,447,051 | 5/1969 | Attwood et al. | 318/118 X |
| 3,488,788 | 1/1970 | Robinson | 15/22 |
| 3,518,766 | 7/1970 | Burt | 310/8.1 X |
| 3,539,888 | 11/1970 | DePrisco et al. | 310/8.1 |
| 3,544,866 | 12/1970 | McLeroy | 318/118 |
| 3,586,936 | 6/1971 | McLeroy | 310/8.1 X |
| 3,689,781 | 9/1972 | Kawada | 310/8.1 |
| 3,703,037 | 11/1972 | Robinson | 32/DIG. 4 X |

*Primary Examiner*—Donovan F. Duggan

[57] ABSTRACT

The invention discloses various embodiments of an ultrasonic kit adapted to be used in the home or for industrial purposes, as well as a variety of ultrasonic motor constructions and ultrasonic converter designs to be used either individually or in combination with each other. The ultrasonic motor is generally of a piezoelectric material having a removable tip or of a design in which the complete motor is contained in a housing, which housing has electrical contact means adapted to be plugged into an adapter which, in turn, is connected to a converter. The motor may be designed such that frequency sensing is provided therein and the feedback signal is utilized by the generator to adjust itself thereto.

34 Claims, 32 Drawing Figures

INVENTORS
ARTHUR KURIS
LEWIS BALAMUTH
MANUAL KARATJAS
BY Leonard W. Suroff
ATTORNEY FIG. 7
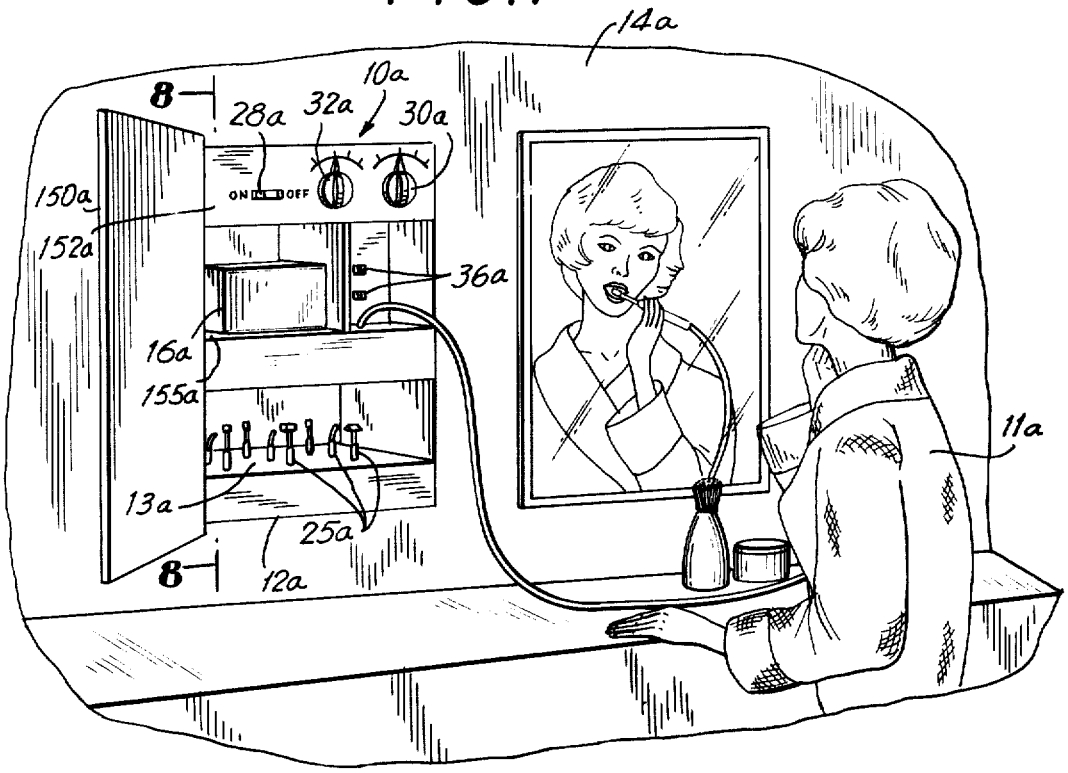
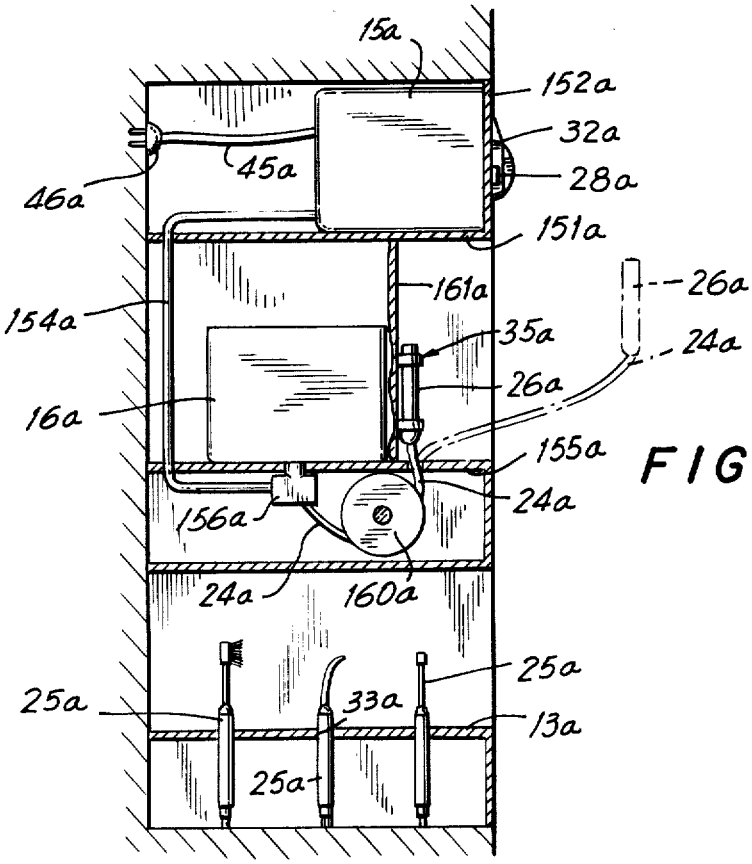
FIG. 8

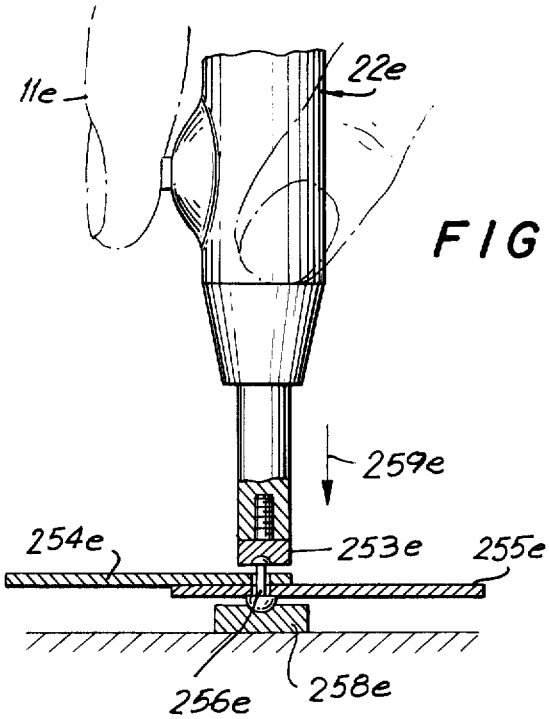
FIG. 25
FIG. 26
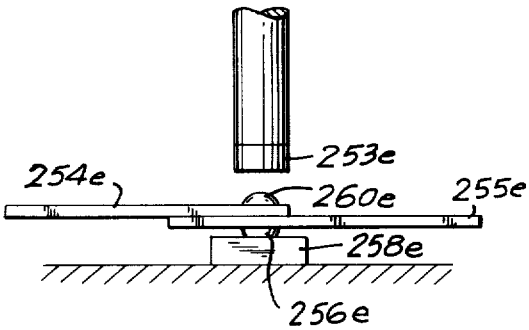
FIG. 27
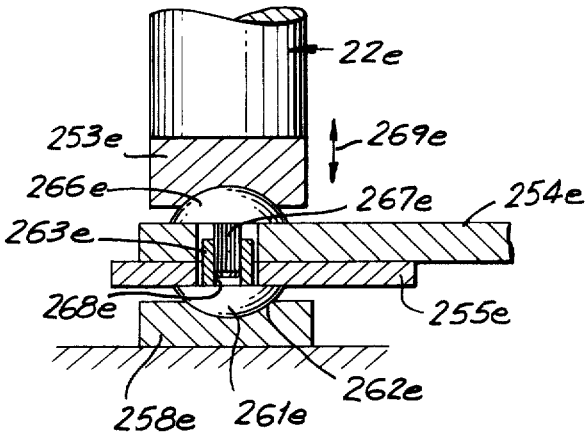
FIG. 28
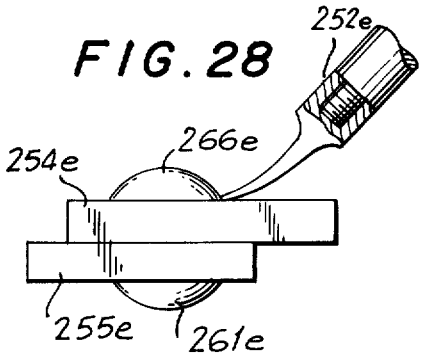

ULTRASONIC KITS AND MOTOR SYSTEMS

Matter enclosed in heavy brackets [ ] appears in the original patent but forms no part of this reissue specification; matter printed in italics indicates the additions made by reissue.

BACKGROUND OF THE INVENTION

The present invention relates to an ultrasonic unit adapted to be used for home, professional and industrial applications to perform a variety of functions, as wall as motor designs and power sources available therefore.

Heretofore, the use of ultrasonic energy has been directed towards the medical and industrial markets without any major attempt to enter the home consumer field via products incorporating an ultraonsic motor adapted to be hand held with a complimentary converter for increasing the normal 60-cycle per second house current to an ultrasonic range, of say 40,000 cyles per second, to energize the motor.

Applicants have now discovered that it is possible to produce home oriented products, by supplying to the consumer a basic kit that permits the user a major degree of flexibility in the application of ultrasonic energy to a number of areas. Accordingly, the present invention comprises one or more kits which may be variously designated as:

1. An ultraonsic hobby kit.
2. An ultraonsic multi-duty home service kit.
3. An ultrasonic universal chores kit.
4. An ultrasonic home workshop and the like.
5. An ultrasonic cosmetic kit which may include a razor, water pick, toothbrush, or prophylaxis unit.

An essential aspect of the ultrasonic motor technology today requires an electrical converter to increase the frequency of the normal house current to an ultrasonic rate, which rate for purposes of this invention is defined within the range of approximately 5,000 to 1,000,000 cycles per second. Accordingly, the present invention in each of its various forms provides a converter, either adapted to be plugged directly into an electrical outlet through an electrical cord or connected to a battery. The converter is electrically connected to the motor which is designed to convert the electrical energy into mechanical vibrations at an ultrasonic rate. The present invention provides various converters adapted to be used in connection with variously housing motors adaptable for a number of applications.

In connection with the home consumer market particularly, the cost to date of the ultrasonic motor-converter systems has hindered the introduction of ultrasonics into the consumer field in any sizeable scale. This invention provides a way for producing the ultrasonic system with the versatility necessary for practical application thereof on an economical basis.

OBJECTS OF THE INVENTION

A primary object of the present invention is to provide a variety of ultrasonic kits adaptable for consumer and commerical use both in the home and industry.

Another object of the present invention is to provide a series of accessories for use with an ultrasonic motor adaptable to be interchangeable so as to produce a series of effects therewith.

Another object of the present invention is to provide a kit including a number of items that may be assembled with ultrasonic energy.

Another object of the present invention is to provide a new and novel ultrasonic motor.

Another object of the present invention is to provide a new and novel ultrasonic motor converter system for multi-purpose use.

Another object of the present invention is to provide a new and novel ultrasonic converter.

Other objects of the invention will be apparent as the description proceeds.

SUMMARY OF THE INVENTION

The apparatus, in accordance with one aspect of the invention, includes a home consumer unit adapted for use for cosmetic purposes, having a plurality of interchangeable accessories to permit the user to carry out various functions with the ability of quick interchangeability and replacement so that various members of the household may have access to the ultrasonic energy imparted to the accessory with a single power source or converter being employed.

In accordance with another aspect of the invention, the ultrasonic instrumentation is contained within a wall unit such that the accessory may be manually withdrawn therefrom during usage and then returned to the wall cabinet when the user has completed such usage.

In accordance with another aspect of the invention, an ultrasonic kit is provided to permit the user to use ultrasonic energy for various hobby purposes; and the kit includes the ultrasonic motor, converter, and a series of interchangeable acceessory elements that function in various manners to carry out the hobbycraft functions. The word "hobbycraft" is used to include various household functions, and is not limited to hobbies per se. The kit further may include various plastic, wood, or metallic parts of various shapes and configurations to be assembled by, or used with, the ultrasonic instrument.

In accordance with another aspect of the invention, a novel ultrasonic motor is disclosed, which provides for the first time an interchangeability within the ultrasonic field of an entire motor that may be plugged or otherwise quickly coupled to a power source such that quick interchangeability is available for various uses.

In accordance with another aspect of the invention, a novel converter design is disclosed that is battery powered so as to be able to drive an ultrasonic motor for a variety of functions.

In accordance with another aspect of the invention, a novel motor-converter system is disclosed in which driving crystals are utilized for powering the motor and a sensing crystal is utilized for monitoring the frequency of the motor.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 7, is a perspective view of an ultrasonic hygienic kit in use;

FIG. 8, is a side elevational view in section of the kit illustrated in FIG. 7;

FIG. 25, is an enlarged view partially in section, of a removable element for use in assembly of component parts;

FIG. 26, is a view similar to FIG. 25 showing the completed assembly operation;

FIG. 27, is a view similar to FIG. 25 of a novel fastener being assembled;

FIG. 28, is a view illustrating the removal of the head formed on the fastener.

PREFERRED EMBODMENTS OF THE INVENTION

Figure 1:
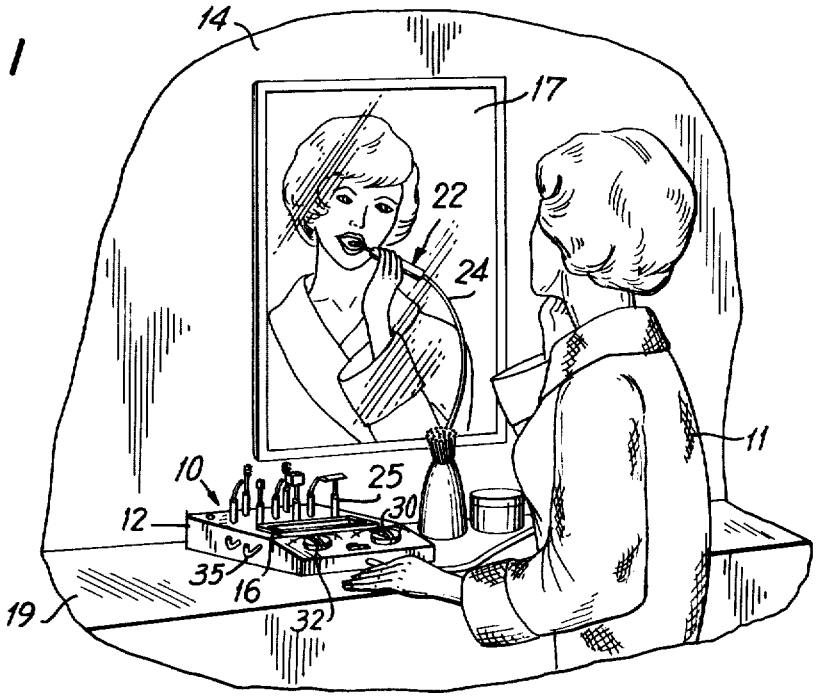
FIG. 1, is a perspective view of an ultrasonic hygienic kit in use.
Figure 2:
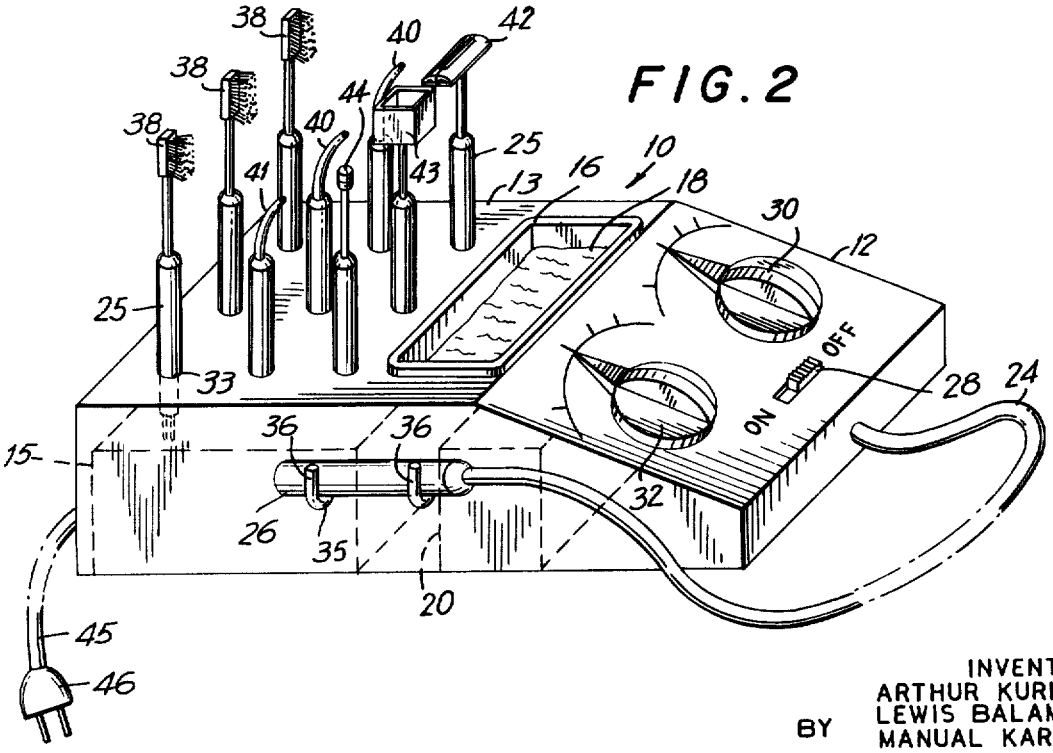
FIG. 2, is a perspective view of the ultrasonic kit as adapted for use.

Turning now to the drawings and particularly to FIGS. 1 and 2 thereof, we have disclosed an ultrasonic system or kit generally indicated by the reference numeral 10, for use by one or more users 11, seen to include a cabinet 12, on table 19, which contains therein an ultrasonic converter 15, as well as a tray or reservoir 16 forming a reservoir on the top 13 thereof, and containing a supply of liquid 18, which, in a conventional manner, is pumped from the reservoir 16 by pumping means 20 contained within the cabinet 12 and connected to the tray 16 to permit the flow of liquid 18 through the pumping means 20. Ultrasonic instrument means 22 is coupled to the converter means 15 and pumping means 20 by cable means 24 which contains a current supply line and a liquid supply line. The ultrasonic instrument 22 is comprised of accessory or implement means 25, that may have various shapes and configurations, and adapted to be removably secured to adapter or coupling means 26. The cabinet 12 contains power control means in the form of a switch 28 having an "On" and "Off" position and a variable switch 30 to regulate the power of converter 15. A liquid means regulator includes a switch 32 that contains a dial to vary the rate of the pump 20, which pumps the fluid from the reservoir 16 through the cable 24 in a manner which is well known in the art.

The cabinet 12 is seen to include support means 35 which may extend from the side wall thereof in the form of bent arms 36 to support the adapter 26 when not in use. The upper surface 13 of the cabinet 12 includes retaining means in the form of a plurality of recesses 33 adapted to receive therein in vertical relationship a plurality of accessories 25, each adapted to be interchangeable with and readily connected to the adapter 26 as hereinafter more fully described with respect to FIGS. 3–6 and FIGS. 9–18. The actual accessory 25 may consist of an ultrasonic toothbrush 38, an ultrasonic water-pick 40, or an ultrasonic prophylaxis unit 41; said water-pick, toothbrush and prophylaxis unit may be made in accordance with U.S. Pat. No. 3,547,110 issued Dec. 15, 1970, by Lewis Balamuth and entitled, "Methods and Apparatus for Maintaining Tooth and Gingival Structures with Ultrasonic Energy," and which patent is assigned to the assignee of the present invention. Another accessory in the form of and ultrasonic razor 42 may also be interchangeable with the adapter 26 and said razor may be of the type disclosed in U.S. Pat. application Ser. No. 872,927, filed Oct. 31, 1969, now U.S. Pat. No. 3,610,080, issued Oct. 5, 1971, by Arthur Kuris and entitled, "Ultrasonic Method and Apparatus for Shaving," and assigned to the assignee of the present invention. Another accessory 25 may be in the form of a container 43 adapted to receive therein a fluid which accessory may be used by the user by inserting their finger therein for doing their nails, to perform a cleansing or other operation thereon. Another accessory 44 may be in the form of a polishing head for polishing and performing other beauty care treatments.

The ultrasonic kit 10, as seen with respect to FIG. 1, and for which the user 11 is using an ultrasonic toothbrush in the mirror 17 on wall 14, permits each family to have their own accessory 25 available to them such that it may be readily interchangeable and connected to the adapter 26 so that when the connection is made electrical energy is transmitted to the working end of the accessory which, as indicated above, may take various shapes and forms and there is disclosed herein are only a sampling of those that might be used in accordance with the present invention. The kit illustrated in FIGS. 1 and 2 is seen to include an electrical plug 46 which is in a conventional manner plugged into a wall outlet and connected by cable 45 to the generator or converter 15 that converts the normal 60-cycle house current to an ultrasonic rate, which as herein designed, is to include the frequency range of 5,000 cycles to 1,000,000 cycles per second. Obviously, the converter 15 may be battery powered as hereinafter described, or the type in which it is battery powered, as hereinafter described, or the type in which it is battery powered for traveling but having a feature in which case a plug would still be utilized.

Accordingly, FIGS. 1 and 2 illustrate a new and novel ultrasonic instrumentation that affords the user, for the first time, to have a variety of ultrasonic implements 25 available to him in a compact manner, to be useable with minimum effort by an entire family in the home. In use, the user 11 merely selects the particular accessory 25 desired for a particular need and then sets out to manually insert the accessory 25 into the adapter 26 in a simple easy manner. The power may then be energized by the "On" and "Off" switch 28 and the amount of liquid 18 from the reservoir 16, if any is desired, may then be selected by the variable switch 32, and the power level selected by variable control switch 30. When the user has completed the use of the accessory 25, he or she may then remove the accessory 25 from the adapter 26, replacing it in the selected retaining means 33 provided therefor and return the adapter to its support means 35.

Figure 4:
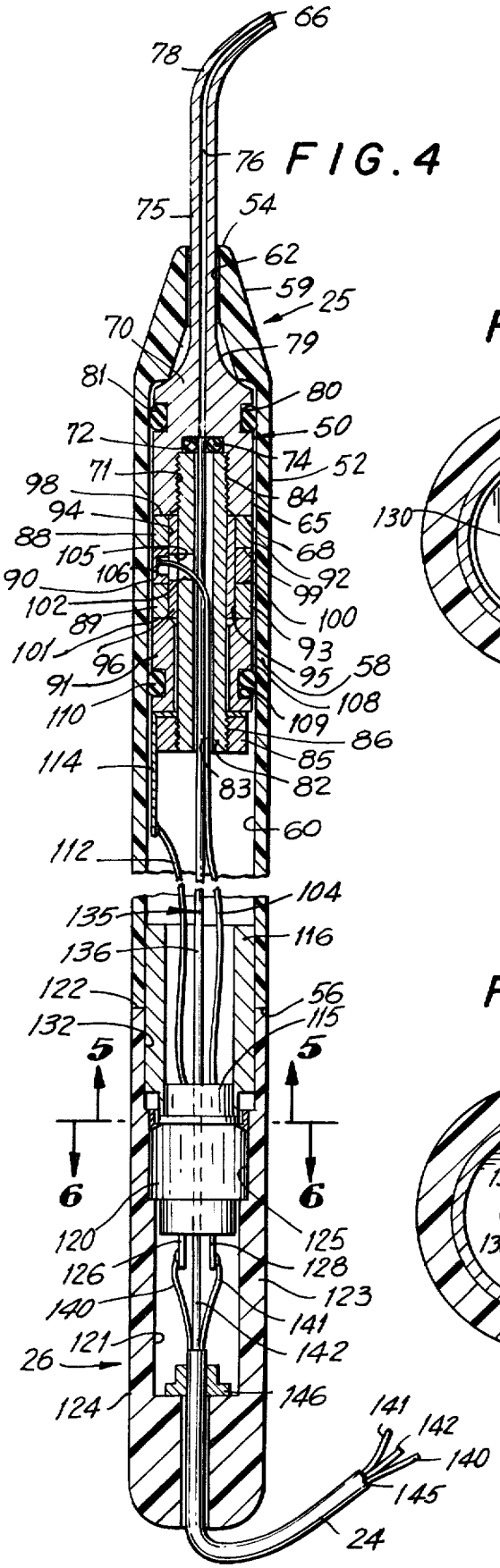
FIG. 4, is a side elevational view in cross-section of the instrument means in assembled relationship taken along a medial plane.
Figure 5:
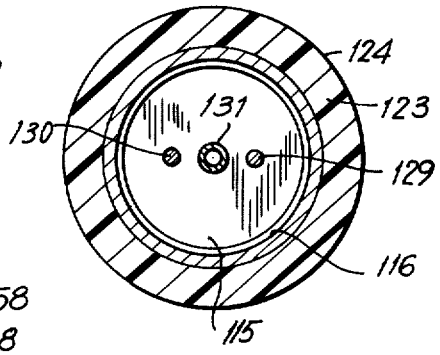
FIG. 5, is a view in cross-section taken along the plane indicated by the line 5—5 in FIG. 4.
Figure 6:
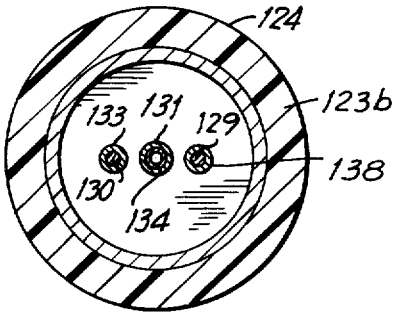
FIG. 6, is a view in cross-section taken along the plane indicated by the line 6—6 in FIG. 4.

FIGS. 4–6 illustrate one form of accessory 25, and adapter 26, construction that may be utilized in accordance with the embodiments of the invention illustrated in FIGS. 1 and 2. The accessory 25 includes an ultrasonic motor or transducer means 50 contained in a tubular housing 52 having a front end 54 and a rear end 56 with the outer wall 58 of the housing 52 having any desired contoured shape or configuration to facilitate it being handled by the user, and a tapered section 59 terminating at the front end 54 of the housing 52 with a chamber or cavity means 60 extending from the rear end 56 of the housing 52 and connected to an axial opening 62 which in turn terminates at the front end 54.

As seen with respect to FIG. 4, the ultrasonic motor 50 is contained within the housing cavity 60 and the hand piece housing 52 may be of plastic or any other suitable material.

The ultrasonic motor 50 includes a transmission member 65 terminating at a working output end or tip 66 at one end thereof and having a rear surface or face 68 at its opposite end. The transmission member 65 may be designed in the form of an acoustical impedance transformer so that there is an increase in the amplitude of mechanical vibration from its rear face 68 to its front tip 66. The actual variations of cross sectional area to obtain the amplitude magnification is well known in the art. The transmission member 65 may be made of a metallic or plastic material depending upon its desired use, for example, if the implement as shown in FIG. 4 has a water feed associated therewith then the unit may be used for dentistry in the form of a dental prophylaxis unit by the dentist or in turn may be of a home consumer design to be used by the user in the home for maintaining tooth and gingival surfaces free of deposits normally contained on the teeth of the user. Essentially, the motor construction, as hereinafter described, for professional and home use, may be of similar design except that the relative power for a home consumer unit would be less than that of a prefessional unit which is used by the dentist since in the home the user is in a sense doing over a 6-month period what the dentist might be doing at one sitting in the dentist's office. Accordingly, the tip 66 may be of a plastic or metallic material depending upon the use thereof and the magnitude of ultrasonic mechanical vibrations to be imparted thereto.

The transmission member has a circular rear section 70 and front section 75, with an internally threaded bore 71 extending from its rear face 68 and terminating in a seat 72 adapted to contain therein sealing means as in the form of an o-ring 74 as hereinafter explained. Communicating with the bore 71 is a longitudinally extending passageway 76 that extends to the front tip 66 of the transmission 65 through the front section 75, which is illustrated to have a curved or contoured portion 78 to permit ready access within the oral cavity. Obviously, the shape, contour and cross sectional area of the passageway 76 may be designed to obtain various spray patterns or flow rates and further, the tip 66 may be designed so as to obtain flexural, lateral, torsional, elliptical, linear or longitudinal motion, by proper control of the shape of the front section 75 of the transmission member which has the bent tip portion 78 formed therewith.

The transmission member 65 has a contoured radius 79 connecting together the front section 75 and the rear section 70 of the transmission member 65, which sections may be both of circular cross sectional area such that the front section 75 extends out beyond the front end 54 of the housing 52 a sufficient distance and through the opening 62 provided therefor. The transmission member 65 may contain an annular depression 80 for motor mounting means, illustrated to be in the form of an o-ring 81, but it may take other forms and shapes as desired. Extending from the rear face 68 of the transmission member 65 is a support member or shaft 82 having a threaded portion 84 which engages the threaded portion 71 of the transmission member 65 and an axially extending passageway or opening 83. The rear end of the support member 82 also has a threaded portion 86 which receives locking means in the form of a nut 85 threaded thereon and adapted to sandwich therebetween under a selected compressive static load a pair of piezoelectric crystals 88 and 89 that may be of a lead zirconate or lead titanate ceramic crystal material, formed so as to be capable of ultrasonic vibrational acitivity in its longitudinal direction when activated by high frequency electrical impulses delivered to it as will be described. The crystals have an external diameter 92 and 93 respectively, which is smaller than the internal diameter of the chamber 60 such that sufficient clearance therebetween is obtained. The internal diameters 94 and 95 of the respective crystals 88 and 89 have a diameter which permits an insulating tubular sleeve 96 to be positioned in surrounding relationship over the support member 82, and extends the length from the front face 98 of crystal 88 to the rear face 101 of the crystal 89. The sleeve 96 is made preferably from an insulative material such as plastic so as to isolate the crystals from the electrode 90 that extends between the rear face 99 of crystal 88 and the front face [of crystals] 100 of crystal 89.

To permit wiring of the motor, wire lead 104 extends through the passageway 83 with the support member 82 having a longitudinally extending opening 102 through the support member wall and through an opening 105 in the insulator sleeve 96 and terminating in a pocket 106 within the disc shaped electrode 90. The wire 104 is soldered or otherwise attached to the electrode 90 for electrical purposes. The rear member 91 fits in telescopic relationship to the support member 82 and has an external diameter 108 which is less than the internal diameter of the chamber 60.

The mounting means for the motor 50 in the housing means 52 consists of spaced apart-o-rings 81 and 110 such that the vibrational energy of the motor when energized, remains substantially isolated therein without the energy being transmitted to the housing 52. A peripheral o-ring seat 109 is provided for o-ring 110 in the housing 52.

Locking means in the form of a nut 85 is secured to the rear threaded portion 86 on shat 82 and is tightened to the point where an axial compressive force is sufficient to compress the crystal 88, electrode 90, crystal 89, and rear section 91 with a predetermined amount of torque. Depending upon the size of the crystals and power of the motor, an epoxy material may be used to bond the parts and crystals together and form the locking means.

As part of the electrical connecting means, a ground lead or conductor 112 is connected to a lug 114, a portion of which extends beneath the nut 85, such that the power leads 104 and 112 are in turn connected to a power source as hereinafter explained.

The ultrasonic motor 50 although shown as piezoelectric may be one of a variety of electromechanical types, such as electrodynamic, piezoelectric or magnetostrictive, and designed for effecting ultrasonic vibrations through hand directed tools of suitable configuration, or larger ones, which are readily replaceable or inter-changeable with other work performing tools or accessories such as for use as acoustically vibrated material treating devices. The motor 50 has components rigidly joined, in end-to-end relationship to form a unit or assembly which is removably supported in a housing containing electrical coupling means to the transducer and receiving alternating current.

The ultrasonic motor 50 is longitudinally dimensioned so as to have lengths which are generally whole multiples of half-wavelengths of the compressional waves established therein at the frequency of the combined longitudinal length of the components so that longitudinal loops or other components of motion occur at the end 66 of the output surface of the transmission member 65. Thus, the optimum amplitude of longitudinal vibration and hyper-accelerations of transmission or coupling member 65 is achieved, and such amplitude is determined by the relationship of the masses of the rear section 70 and front section 75 which may be made effective to either magnify or reduce the amplitude of the vibrations received from the transducer crystals. The front section 75 may be permanently attached to the rear section 70, or the front section 75, or part thereof, may be provided with a threaded stud adapted to be screwed into a tapped hole in the end of the transmission member 65 for effecting rigid connection of a removable element thereto.

The rear end 56 of the casing of housing 52 has an electric connector or plug 115 connected thereto by means of a bushing 116, which extends beyond the rear end of the housing 52 and may be secured thereto in any conventional manner. The connector 115 is seated at one end of the bushing 116 and adapted to mate with an opposite type connector 120; i.e., female, such that electrical energy may be transmitted to the motor 50.

The adapter 26 is designed to match the rear end of the housing 52 and includes a cavity 121 having a front end 122 which abuts the rear end 56 with a wall portion 123 having an external diameter 124 that may be of the same outside diameter as the housing 52. The female connector 120 is contained within a counterbore 125 having electrical contacts 126 and 128 and may be seated therein by a press fit such that the electrical terminals or prongs 129 and 130 and water feed 131 of the connector 115, as seen in FIGS. 5 and 6, are adapted to mate with the female receptacle 120 having receiving prongs or contacts 133, 134 and 138. The terminals 129, 130 and 131 extend from the front of the connector 115 and the two power leads 104 and 112 are connected to 129 and 130 respectively and, in turn, to prongs 133 and 134 which connect to contacts 126 and 128 respectively. The sleeve 116 extends in telescopic relation to the adapter 26 and by a frictional fit extends within a seat 132 on the front of adapter housing 26. The present embodiment of the ultrasonic motor system is adapted to have a fluid pass therethrough such that the instrument may be used as a water pick or dental prophylaxis unit and accordingly, fluid supply means 135 is provided in the form of a flexible tube or conduit 136 that extends through the sleeve 116 and is coupled to the receptacle 115 which in turn has its prong 131 that mates with prong 134 in receptacle 120 in a conventional manner. The conduit 136 extends from the receptacle 115 and through the axial bore 83 in the shaft 82 to be in axial alignment with the passageway 76 extending from the bottom surface or seat 72 to the tip 66 of the transmission member 65. The conduit 136 may abut the bottom of the seat 72 and be retained in place by sealing means in the form of an o-ring 137 to afford a structurally fluid tight seal. Other means of coupling the front to the fluid connecting member 136 may be utilized in order to have a continuous flow of fluid, such as water, from a desired source, which may be from a tap or a mechanical pump as discussed with respect to FIGS. 1 and 2, for maintaining a stream of fluid on a continuous or intermittent basis. The vibratory mechanical energy generated in the motor is in turn transmitted to the fluid through the front member as discussed in accordance with U.S. Pat. No. 3,547,110.

The contacts 126 and 128 have wires 140 and 141 connected thereto and liquid conduit 142 connects to terminal 134, with all being contained within a flexible sheath 145 and together forming cable 24. A stop member 146 firmly grips the sheath 145 and members therein.

Figure 3:
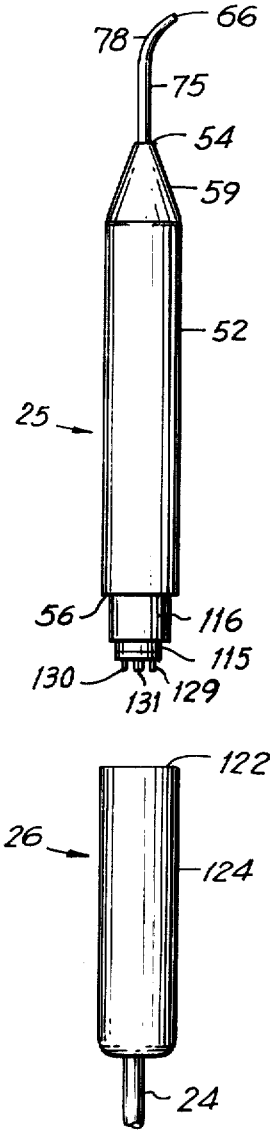
FIG. 3, is a side elevational view of ultrasonic instrument means for use in the present invention.

FIGS. 7 and 8 illustrate an ultrasonic kit 10a of a similar nature to that illustrated in FIGS. 1 and 2, except that the entire kit 10a is situated within a cabinet 12a that is built within the wall 14a of the home of the user 11a and access to the accessories 25a as well as the power On-Off switch 28a, power regulation 30a and fluid regulator switch 32a are obtained by opening the door 150a to the cabinet 12a. As seen in particular with respect to FIG. 8, the cabinet 12a contains a lower shelf 13a or wall having a plurality of openings 33a and each opening adapted to receive therein an accessory 25a which may be of the type discussed above with respect to FIGS. 1 and 2. The upper portion of the cabinet 12a contains an upper wall 151a and a front panel 152a through which the knob control switches 28a, 30a and 32a extend with the converter 15a positioned on the upper wall 151a and connected to the normal house current via cable 45a and plug 46a. An electrical power cable 154a extends from the converter 15a through the upper wall 151a and through a middle wall 155a, which latter wall supports the reservoir 16a which, as seen in FIG. 3 may be readily removed for replenishing the supply of liquid therein. The bottom of the reservoir 16a is coupled to a fitting 156a in which the power cable 154a is connected to, and fluid supply and power supply merge into cable 24a, and are then wound on a spring loaded or other commercially type available take-up or retracting means in the form of a reel 160a such that the adapter 26a from its retracted position as seen in FIG. 8 is retained in place by supporting means 35 with support arms or clips 36a, mounted on panal 161a to its extended position as seen in FIG. 7 so that it is ready for use by the user 11a. The manner of operation is similar to that described in FIGS. 1 and 2, and by supplying a spring loaded take-up reel 160a, the problems of a loose cable 24a are eliminated.

FIGS. 9–13 illustrate another form of accessory 25b and adapter 26b that may be utilized in accordance with the embodiments of the invention illustrated in FIGS. 1 and 2, and 7 and 8, and having an added feature of a removable element 165b. The accessory 25b includes an ultrasonic motor or transducer means 50b contained in a tubular housing 52b having a front end 54b and a rear end 56b with the outer wall 58b of the housing 52b having any desired contoured shape or configuration to facilitate it being handled by the user, and a tapered section 59b terminating at the front end 54b of the housing 52b with a chamber or cavity means 60b extending from the rear end 56b of the housing 52b and connected to an axial opening 62b which in turn terminates at the front end 54b.

Figure 10:
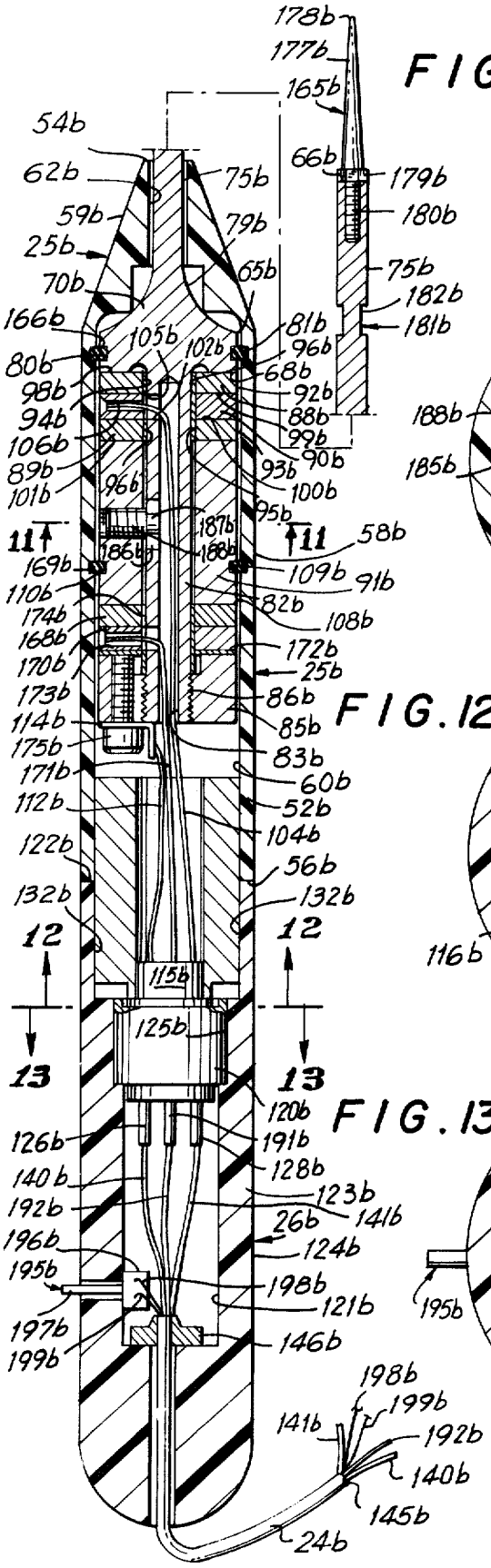
FIG. 10, is a side elevational view in cross-secion of the instrument means in assembled relationship taken along a medial plane.

As seen with respect to FIG. 10, the ultrasonic motor 50b in contained within the housing cavity 60b and the hand piece housing 52b may be of plastic or any other suitable material. The ultrasonic motor 50b includes a transmission member 65b terminating at a working output end or tip 66b at one end thereof and having a rear surface or face 68b at its opposite end. The transmission member 65b may be designed in the form of an acoustical impedance transformer so that there is an increase in the amplitude of mechanical vibration from its rear face 68b to its front tip 66b. The actual variations of cross sectional area obtain the amplitude magnification is well known in the art. The transmission member 65b may be of a metallic or plastic material depending upon its desired use with the removable element 165b having a water feed through as shown in FIG. 4; then the unit may be used for dentistry in the form of a dental prophylaxis unit by the dentist or in turn may be of a home consumer design to be used by the user in the home for maintaining tooth and gingival surfaces free of deposits normally contained on the teeth of the user. Essentially, the motor construction, as hereinafter described, for professional and home use, may be of similar design except that the relative poser for a home consumer unit would be less than that of a professional unit which is used by the dentist, since in the home the user is in a sense doing over a 6-month period what the dentist might be doing at one sitting in the dentist's office. Accordingly, the removable element 165b may be of a plastic or metallic material depending upon the use thereof and the magnitude of ultrasonic mechanical vibrations to be imparted thereto.

The transmission member 65b has a contoured radius 79b connecting together the front section 75b and the rear section 70b of the transmission member 65b, which sections may be both of circular cross sectional area such that the front section 75b extends out beyond the front end 54b of the housing 52b a sufficient distance and through the opening 62b provided therefor. The transmission member 65b may contain an annular depression 80b and casing 52b with an annular depression 166b, for motor mounting means, illustrated to be in the form of an o-ring 81, positioned in each of said depressions. Extending from the rear face 68b of the transmission member 65b is a support member or shaft 82b that may be integrally formed therwith, and having an axially extending passageway or opening 83b. The rear end of the support member 82b has a threaded portion 86b which receives locking means in the form of a nut 85b threaded thereon and adapted to sandwich therebetween under a selected compressive static load a pair of driving piezoelectric crystals 88b and 89b and a third crystal 168b forming part of the sensing means, that may be of a lead zirconator or lead titanate ceramic crystal material, formed so as to be either capable of ultrasonic vibrational activity in its longitudinal direction when activated by high frequency electrical impulses delivered to it, or detecting the frequency of the motor as will be described. The driving crystals have an external diameter 92b and 93b respectively, which is smaller than the internal diameter of the chamber 60b such that sufficient clearance therebetween is obtained. The internal diameters 94b and 95b of the respective crystals 88b and 89b have a diameter which permits an insulating tubular sleeve 96b to be positioned in surrounding relationship over the support member 82b, and extends the length from the front face 98b of crystal 88b to at least the rear face 101b of the crystal 89b. The sleeve 96b is made preferably from an insulative material such as plastic so as to isolate the crystals from the electrode 90b that extends between the rear face 99b of crystal 88b and the front face of crystal 100b of crystal 89b.

To permit wiring of the motor, wire lead 104b extends through the passageway 83b with the support member 82b having a longitudinally extending opening 102b through the support member wall and through an opening 105b in the insulator sleeve 96b and terminating in a pocket 106b within the disc shaped electrode 90b. The wire 104b is soldered or otherwise attached to the electrode 90b for electrical purposes. The rear member 91b fits in telescopic relationship to the support member 82b and has an external diameter 108b which is less than the internal diameter of the chamber 60b.

A peripheral o-ring seat 109b is provided on the support member 82b and an o-ring seat 169b is provided in the cavity 80b for o-ring 110b such that the mounting means for the motor 50b in the housing means 52b consists of spaced apart o-rings 81b and 110b such that the vibrational energy of the motor when energized, remains substantially isolated therein without the energy being transmitted to the housing 52b. By providing o-ring seats in the housing 52b as well as on the motor 50b axial movement of the motor relative to the housing is substantially prevented when a force is applied to the removable element 165b.

The motor 50b illustrated in FIG. 10 has frequency sensing means in the form of a third crystal 168b which abuts the rear member 91b on one side thereof and an electrode 170b on its opposite side with an insulating washer 172b between the electrode 170b and locking nut 35b. A tubular sleeve 174b of insulating material extends on the support member 82b at least the axial length of the crystal 168b, electrode 170b and washer 172b. A wire lead 171b is connected within a pocket 173b and in turn is connected to the connector 115b.

The nut 85b forming the locking means is secured to the rear threaded portion 86b on shaft 82b and is tightened to the point where an axial compressive force is sufficient to compress the crystal 88b electrode 90b, crystal 89b, rear section 91b, crystal 168b and electrode 170b, with a predetermined amount of torque.

As part of the electrical connecting means, a ground lead or conductor 112b is connected to a lug 114b, a portion of which extends beneath the head of a screw 175b that is screwed into nut 85b, such that the power leads 104b and 112b are in turn connected to a power source as hereinafter explained.

The accessory 25b in this form of the invention is seen to include element means 165b that is designed to be removable from the front section 75b of the motor 50b. Various forms of the attachment may be employed so that the user may conveniently and quickly replace the element 165b with minimal effort. One such form is shown in FIG. 10 in which the element means 165b includes a neck portion 177b terminating in a head portion 178b, with the neck portion illustrated in the form of a cone. The neck portion may take various forms and shapes to permit the user to perform various jobs with them—such as a knife for cutting materials, a bent tip for various modes of vibration and permitting access to various areas, etc. The neck portion 117b merges with a body portion 179b, illustrated in the form of a hexagon nut to permit it to be gripped for tightening and loosening it relative to the motor 50b. The fastening portion 180b may be integrally formed with the body portion 179b and may be in the form of threads to threadably engage a tapped portion in the front section 75b.

To assist in tightening and loosening the removable element 165b, securing means 181b may be employed in the form of a pair of flats or slots 182b to be gripped by a wrench. In this manner one wrench is applied at body portion 179b and another at the slots 182b and turned relative to each other until firmly secured in place.

Figure 11:
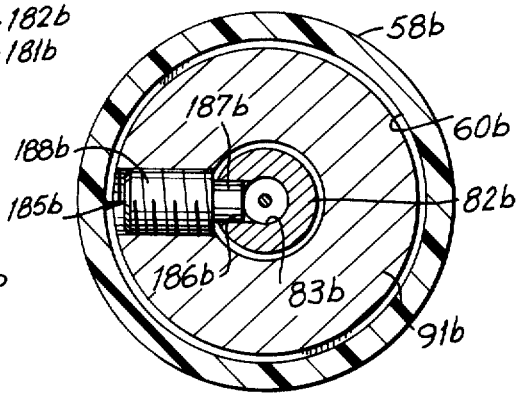
FIG. 11, is a view in cross-section taken along the plane indicated by the line 11—11 in FIG. 10.

To aid in assembly of the motor 50b positioning means 185b may be provided as seen in FIGS. 10 and 11 to prevent angular rotation, but not longitudinal displacement, of the rear member 91b relative to the support member 82b when the nut 85b is tightened. The positioning means 185b includes a transverse opening 186b in the support member 82b dimensioned to accept the lip 187b, of a screw 188b which is threadably engaged in the rear member 91b, with a minimum of clearance. In this manner, the rear member 91b moves in the longitudinal direction to compress the crystals 88b and 89b when the nut 85b is rotated. At the completion of the assembly of the motor 50b, the screw 188b may be removed or held permanently in place by an epoxy (not shown).

The rear end 56b of the casing or housing 52b has an electric connector or plug 115b connected thereto by means of a bushing 116b, which extends beyond the rear end of the housing 52b and may be secured thereto in any conventional manner. The connector 115b is seated at one end of the bushing 116b and adapted to mate with an opposite type connector 120b; i.e., female, such that electrical energy may be transmitted to the motor 50b.

Figure 12:
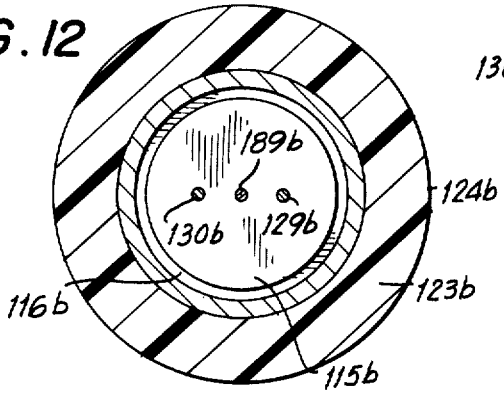
FIG. 12, is a view in cross-section taken along the plane indicated by the line 12—12 in FIG. 10.
Figure 13:
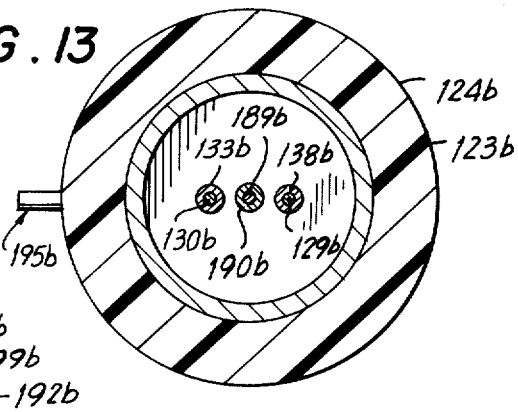
FIG. 13, is a view in cross-section taken along the plane indicated by the line 13—13 in FIG. 10.

The adapter 26b is designed to match the rear end of the housing 52b and includes a cavity 121b having a front end 122b which abuts the rear end 56b with a wall portion 123b having an external diameter 124b that may be of the same outside diameter as the housing 52b. The female connector 120b is contained within a counterbore 125b having electrical contacts 126b and 128b and may be seated therein by a press fit such that the electrical terminals or prongs 129b, 130b, and 189b of the connector 115b, as seen in FIGS. 12 and 13, are adapted to mate with the female receptacle 120b having received prongs or contacts 133b, 190b, and 138b. The terminals 129b, 130b, and 189b extend from the front of the connector 115b and the three power leads 104b, 112b, and 171b are connected to 129b, 130b, and 189b respectively and, in turn, to prongs 133b, 134b, and 189b, which connect to contacts 126b, 128b, and 191b respectively, as seen in FIG. 10. The sleeve 116b extends in telescopic relation to the adapter 26b and by a frictional fit extends within a seat 132b on the front of adapter housing 26b. The present embodiment of the ultrasonic motor system may be adapted to have a fluid pass therethrough such that the instrument may be used as a water pick or dental prophylaxis unit and accordingly, may be of the design as illustrated in FIGS. 3–6.

The contacts 126b, 128b and 191b have wires 140b, 141b and 192b connected thereto, with all being contained within a flexible sheath 145b and together forming cable 24b. A stop member 146 firmly grips the sheath 145b and members therein.

Figure 9:
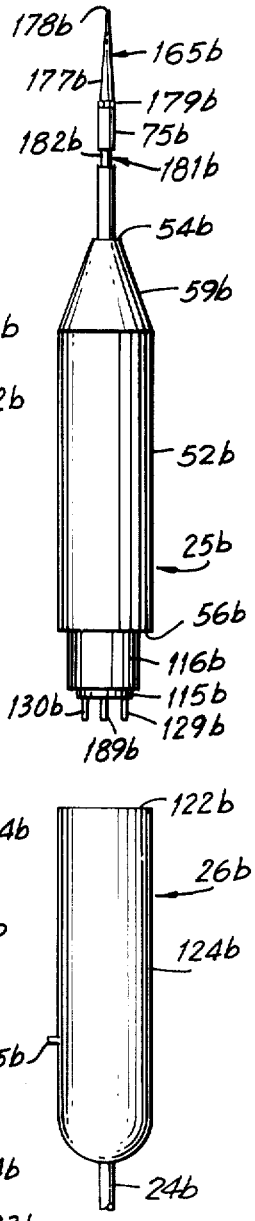
FIG. 9, is a side elevational view of ultrasonic instrument means for use in the present invention.

The motor 50b may have the current thereto controlled from either the convertor as illustrated in FIGS. 1 and 2, or switching means 195b may be provided on the instrument means on either the accessory 25b or on the adapter 26b as illustrated in FIGS. 9 and 10. The switching means 195b may include a switch 196b contained within the adapter housing 26b with a push button 197b extending through the wall 123b and externally of the adapter. Electrical leads 198b and 199b extend from the switch 196b and are connected to the converter. The switch may be one of a variety of types commercially available.

FIGS. 14–18 illustrate another form of accessory 25c and adapter 26c that may be utilized in accordance with the embodiments of the invention illustrated in FIGS. 1 and 2; and 7 and 8, and having an added feature of the electrical coupling means 200c contained within the housing 52c so that the motor 50c is coupled to electrical contacts without any wires extending from the motor 50c. The accessory 25c includes an ultrasonic motor or transducer means 50c contained in a tubular housing 52c having a front end 54c and a rear end 56c with the outer wall 58c of the housing 52c having any desired contoured shape or configuration to facilitate it being handled by the user, and a tapered section 59c terminating at the front end 54c of the housing 52c with a chamber or cavity means 60c extending from the rear end 56c of the housing 52c and connected to an axial opening 62c which in turn terminates at the front end 54c.

The transmission member 65c has a contoured radius 79c connecting together the front section 75c and the rear section 70c of the transmission member 65c, which sections may be both of circular cross sectional area such that the front section 75c extends out beyond the front end 54c of the housing 52c a sufficient distance and through the opening 62c provided therefor.

Extending from the rear face 68c of the transmission member 65c is a support member or shaft 82c that may be integrally formed therewith. The rear end of the support member 82c has a threaded portion 86c which receives locking means in the form of a nut 85c threaded thereon and adapted to sandwich therebetween under a selected compressive static load a pair of driving piezoelectric crystals 88c and 89c, and a third crystal 168c forming part of the sensing means, that may be of a lead zirconate or lead titanate ceramic crystal material, formed so as to be either capable of ultrasonic vibrational activity in its longitudinal direction when activated by high frequency of the motor, as will be described. The driving crystals have an external diameter 92c and 93c respectively, which is smaller than the internal diameter of the chamber 60c such that sufficient clearance therebetween is obtained. The internal diameters 94c and 95c of the respective crustals 88c and 89c have a diameter which permits an insulating tubular sleeve 96c to be positioned in surrounding relationship over the support member 82c, and extends the length from the front face 98c of crystal 88c to at least the rear face 101c of the crystal 89c. The sleeve 96c is made preferably from an insulative material such as plastic so as to isolate the crystals from the electrode 90c that extends between the rear face 99c of crystal 88c and the front face of crystal 100c of crystal 89c. The rear member 91c fits in telescopic relationship to the support member 82c and has an external diameter 108c which is less than the internal diameter of the chamber 60c.

The transmission member 65c may contain an annular depression 166c, for motor mounting means, illustrated to be in the form of an o-ring 81c, positioned in each of said depressions. A peripheral o-ring seat 169c is provided in the cavity 60c for o-ring 110c such that the mounting means for the motor 50c in the housing means 52c consists of spaced apart o-rings 81c and 110c such that the vibrational energy of the motor when energized, remains substantially isolated therein without the energy being transmitted to the housing 52c. By providing o-ring seats in the housing 52c, as well as on the motor 50c, axial movement of the motor relative to the housing is substantially prevented when a force is applied.

Figure 15:
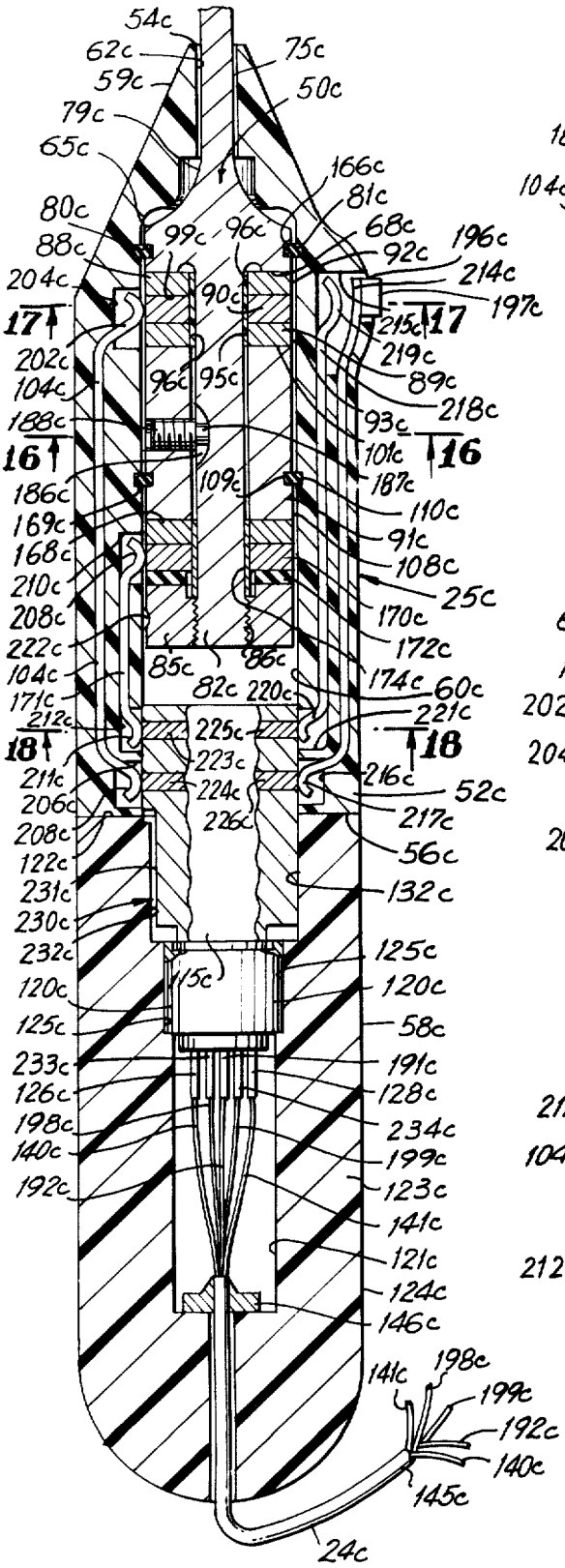
FIG. 15, is a side elevational view in cross-section of the instrument means is assembled relationship taken along a medial plane.

The motor 50c illustrated in FIG. 15 has frequency sensing means in the form of a third crystal 168c which abuts the rear member 91c on one side thereof and an electrode 170c on its opposite side with an insulating washer 172c between the electrode 170c and locking nut 35c. A tubular sleeve 174c of insulating material extends on the support member 82c at least the axial length of the crystal 168c, electrode 170c and washer 172c.

The nut 85c forming the locking means is secured to the rear threaded portion 86c on shaft 82c and is tightened to the point where an axial compressive force is sufficient to compress the crystal 88c electrode 90c, crystal 89c, a rear section 91c, crystal 168c and electrode 170c with a predetermined amount of torque.

Figure 16:
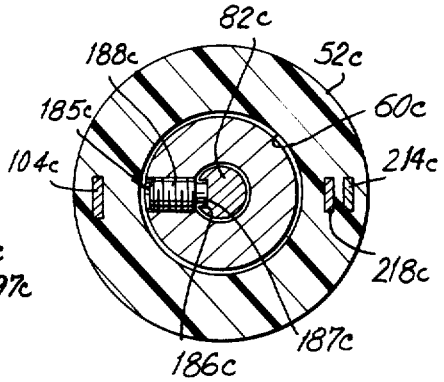
FIG. 16, is a view in cross-section taken along the plane indicated by the line 16—16 in FIG. 15.
Figure 14:
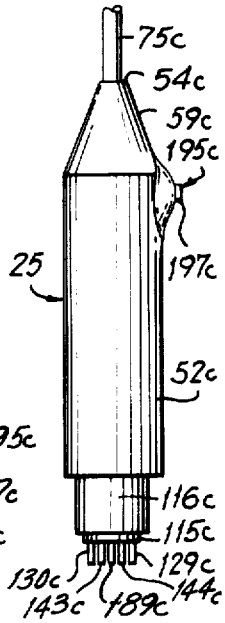
FIG. 14, is a side elevational view of ultrasonic instrument means for use in present invention.

To aid in assembly of the motor 50c positioning means 185c may be provided as seen in FIGS. 15 and 16 to prevent angular rotation, but not longitudinal direction, of the rear member 91c relative to the support member 82c when the nut 85c is tightened. The positioning means 185c includes a transverse opening 186c in the support member 82c dimensioned to accept the lip 187c of a screw 188c which is threadably engaged in the rear member 91c, with a minimum of clearance. In this manner, the rear member 91c moves in a linear path to compress the crystals 88c and 89c when the nut 85c is rotated. At the completion of the assembly of the motor 50c, the screw 188c may be removed or held permanently in place by an epoxy (not shown).

The adapter 26c is designed to match the rear end of the housing 52c and includes a cavity 121c having a front end 122c which abuts the rear end 56c with a wall portion 123c having an external diameter 124c that may be of the same outside diameter as the housing 52c. The female connector 120c is contained within a counterbore 125c and may be seated therein by a press fit such that the electrical terminals or prongs of the connector 115c are adapted to mate with the female receptacle 120c having receiving prongs or contacts. The connector 115c extends in telescopic relation to the adapter 26c and fits within a seat 132c on the front of adapter housing 26c. The present embodiment of the ultrasonic motor system may be adapted to have a fluid pass therethrough.

Figure 17:
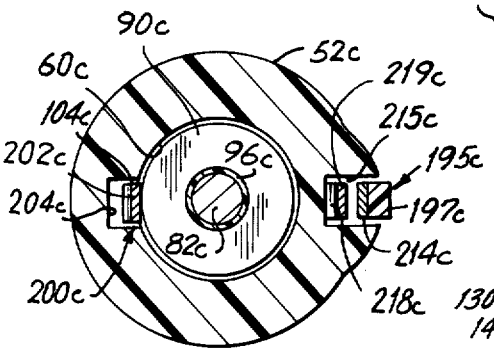
FIG. 17, is a view in cross-section taken along the plane indicated by the line 17—17 in FIG. 15.
Figure 18:
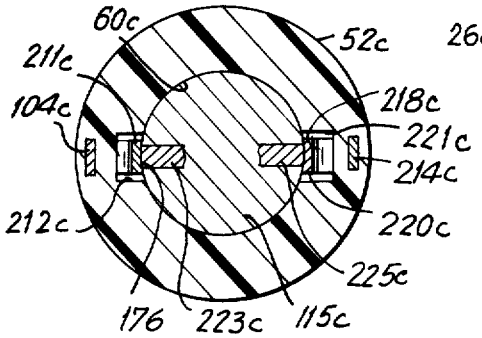
FIG. 18, is a view in cross-section taken along the plane indicated by the line 18—18 in FIG. 15.
Figure 18:
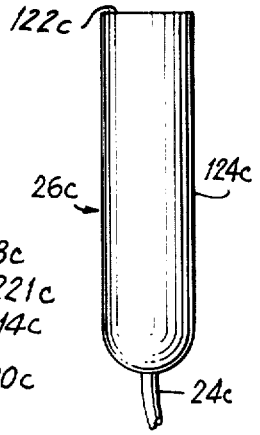
Figure 19:
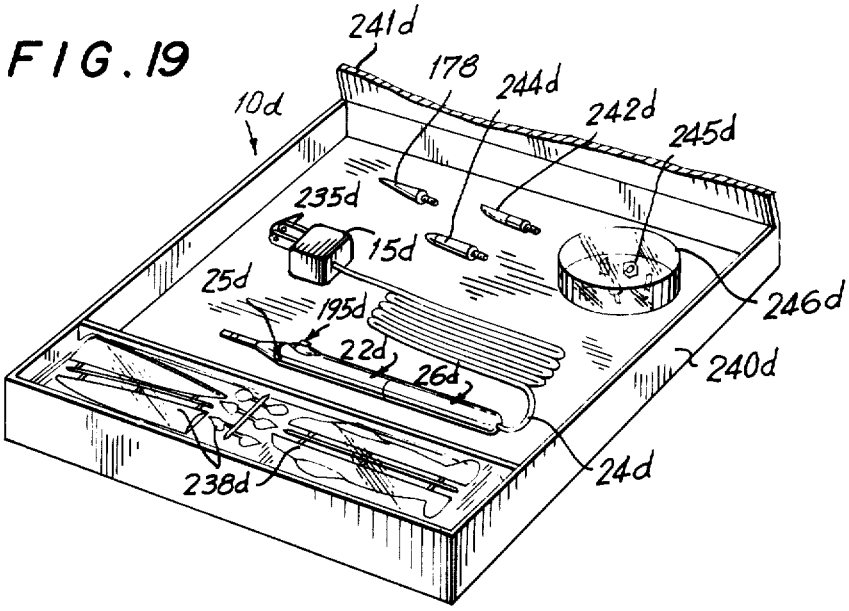
FIG. 19, is a form of kit that is primarily intended for the hobbyist.

In this embodiment of the invention, electrical coupling means 200c is utilized such that the motor 50c is merely placed within the cavity 60c and held in place by the o-rings, or other mounting means; and complete electrical contact is accomplished such that no actual wiring of the motor takes place. In this manner, for high production quantities particularly, the problem of a soldered lead breaking due to the vibratory stress generated is eliminated. In addition, by molding in the electrical contacts within say a plastic housing, further savings are obtained in manufacturing costs. Essentially the wire leads are incorporated within the housing 52c as seen in FIGS. 15, 17 and 18.

The contact lead to the electrode 90c is a filament 104c that has a front hooked or bent section 202c contained in a pocket or recess 204c that is adapted to engage and transmit pressural contact thereagainst to couple the electrical energy thereto. The filament 104c may have a rectangular, circular or other cross-section, and extends substantially the length of the housing 52c and terminates openly in a rear recess 206c with a contoured portion 208c contained therein. The rear electrode 170c has electrical energy coupled thereto by means of filament 171c embodied in the casing 52c and having a front contoured portion 208c contained in a front recess 210c with a rear portion 211c in a rear recess 212c.

Switching means 195c is contained in the accessory 25c and adapted to be engaged by the user when operation of the motor is desired. The switching means 195c includes a switch 196c having a push button or contact 197c that extends beyond the housing for finger engagement and is coupled to a contact element 214c with its free end, contained within a cavity 215c contained within the housing 52c.

The switch 196c has the contact element 214c embedded within the housing wall and extending therethrough and terminating in a rear cavity 216c which has therein the bent portion 217c of the contact element 214c such that a certain degree of rigidity is provided as hereinafter discussed. The other electrical contact of the switch is provided in the form of a similarly contained electrical element 218c that terminates in the cavity 215c in a contoured section 219c such that, upon depression of the push button 197c, contact is made between the element 214c and the curved portion 219c, such that in a normal conventional manner the circuit is closed and current from the converter is transmitted to the ultrasonic motor 50c. The rear of the element 218c similarly has a curved section 220 which terminates in a pocket on cavity 221c. The switch may obviously take many forms and is positioned for ready access between the user's finger when in those instances it is desirable to first obtain the output end of the ultrasonic motor and the member to which the ultrasonic energy is to be transmitted. This permits an easier positionment of the motor tip since, upon energizing, there is immediate movement between the tip and the work piece; and, accordingly, there are those instances where the switch is desired to be positioned as illustrated in FIGS. 14–18. The electrical coupling means 200c as herein described may be encapsulated within the plastic housing in the manufacturing process thereof, such that in actual assembly the motor 50c is pre-assembled and need merely be positioned within the housing in a keyed manner. In this manner upon the o-rings being positioned in the seats provided, the electrodes 90c and 170c are in relative axial position for contact with electrical elements. This is an important feature of this embodiment of the invention in that it permits mass production of ultrasonic motors in a housing where there is no wiring or solder joints on the respective motor or housing, or therebetween.

Once the motor is contained within the housing 52c, then the connector 115c is positioned within the cavity 60c as disclosed and in this embodiment of the invention electrical contacts are provided to engage the respective electrical contacts described above. Accordingly, electrical contact 223c meets with electrode 171c, contact 224c meets with electrode 104c, contact 225c meets with the element 218c, and contact 226c meets with 214c. In turn, the respective contacts are pre-wired or otherwise molded so that their respective pins of connector 115c meet with the connector 120c in a conventional manner.

In order to assure proper orientation of connector 115c relative to the housing 124c, positioning means 230c is provided in the form of a keyway or depression 231c on the connector 115c and a complimentary nib or tooth 232c is provided, as seen in FIG. 15, on the casing 124c, such that the user may easily orient the connector 115c relative to the casing 124c.

The connecting pins on the connector 115c are wired via 120c. Five of such connections are shown in that nut 85c similarly has an electrode portion connecting it via element 222c partially seen in FIG. 15. Accordingly, the contact 104c, through contact 224c, is wired to contact 128c and in turn to wire 141c. Contact 171c is wired through 223c to contact 191c and in turn through wire 192c. Contact 222c is wired to contact 126 and in turn to wire 140c. Contact 225c is in turn wired to contact 233c and in turn wire 198c. Contact 226c is in turn wired to contact 234c and in turn 199c. Accordingly, all the wires fit through sleeve 145c and are in turn wired to their respected designated positions within the converter.

Figure 20:
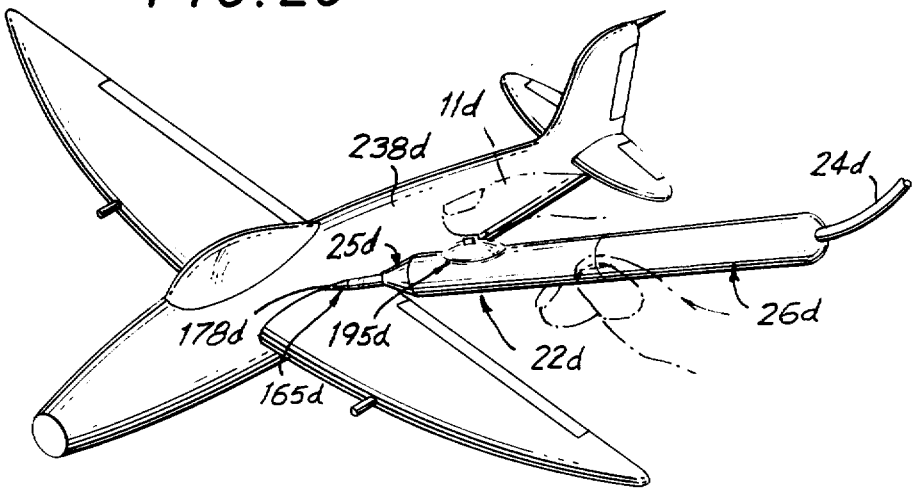
FIG. 20, illustrates the instrument means of the kit used for assembly of a plastic model.
Figure 21:
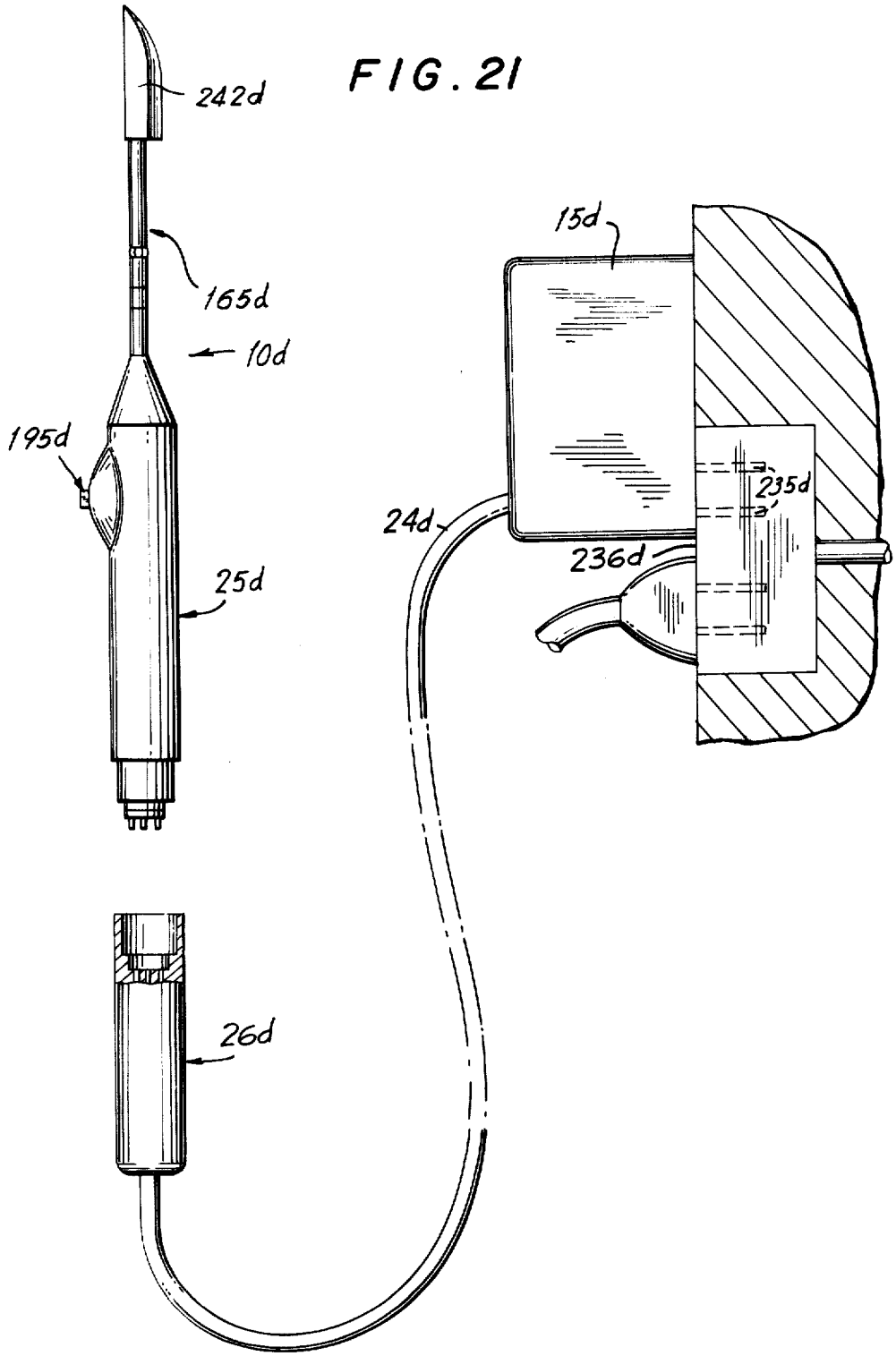
FIG. 21, illustrates an ultrasonic system having a converter adapted to be plugged into a wall outlet.

FIGS. 19–22 illustrate a kit 10d that includes instrument means 22d with a plurality of interchangeable elements 165b adapted to be removably secured to the output section of the accessory 25d and having a converor 15d which, as seen in FIG. 21, is of a size in that the male prongs 235d will extend outwardly from one edge of the converter 15d and are adapted to be plugged into a wall outlet 236d. In this manner the user essentially does not have to position his convertor on a table or other working area but may merely plug into the wall outlet 236d the ultrasonic convertor and by means of the cable 24d operated by switching means 195d, on the accessory 25d, may readily perform whatever function he desires. As seen in FIG. 20, we have a model plastic airplane 238d that may be included as part of the kit 10d such that the user 11d, upon purchase of the kit 10d, has contained therein one or more models, or other items, to be worked upon utilizing the ultrasonic instrument means 22d packaged with the kit.

As seen in FIG. 20, the ultrasonic element 165d is interposed between the mating joints of the airplane and by moving same at the joint a flow of plastic occurs which is sufficient to cause a fusion of the plastic parts. The kit 10d further includes in its carton or other packaging means 240d, with cover 241d, a number or removable elements in various shapes and forms. Those illustrated are with a pointed tip element 178d as in FIGS. 9 and 10, for use as in FIG. 20 for plastic assembly, a knife element 242d as seen in FIG. 21, and a round pointed element 244d as seen in use in FIG. 22. Accordingly, the kit is adaptable for use in a great variety of hobby-craft applications and as such a supply of disposable parts 245d may be contained in a container 246d in the kit 10d. The disposable parts 245d may be of plastic, metal or other material.

Accordingly, all types of plastic, glass, metal, wood, leather, and other materials may be worked upon with the kit 10d. As seen in FIG. 20 the instrument means 22d is used by the user 11d to assemble a plastic model and control the power by the finger tip switching means 195d.

FIG. 21 illustrates the removable element 165d in the form of a knife element 242d. Accordingly, a number of accessories 25d may be purchased by the user, such that even if the elements are removable, the user may have the ones he uses most often already assembled to an accessory 25d which is quickly and easily removed from the adapter 26d. This type of system gives the user maximum flexibility between interchangeability of the accessory and the removable elements to be used. Further, the convertor 15d is plugged directly into the wall outlet 236d for the convenience of the user.

Figure 22:
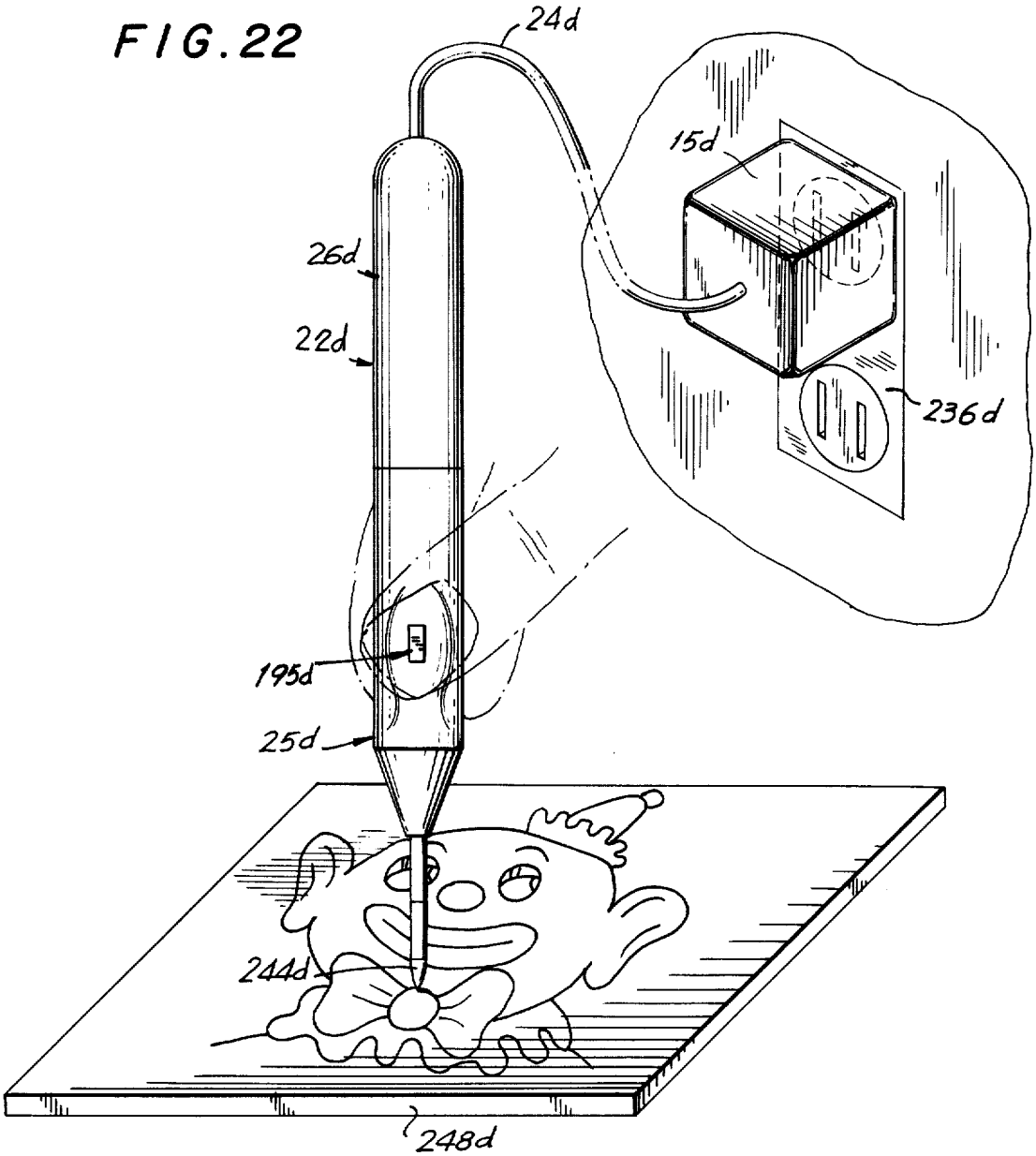
FIG. 22, illustrates the system for use in another hobbycraft.

FIG. 22 illustrates yet another application in which the instrument means 22d, connected to the power cable 24d and in turn to the convertor 15d, is plugged within the wall outlet 236d. In operation the finger switching means 195d is used to vibrate the removable element 244d which is in contact with a wood member 248d such as for wood burning or other applications.

Figure 23:
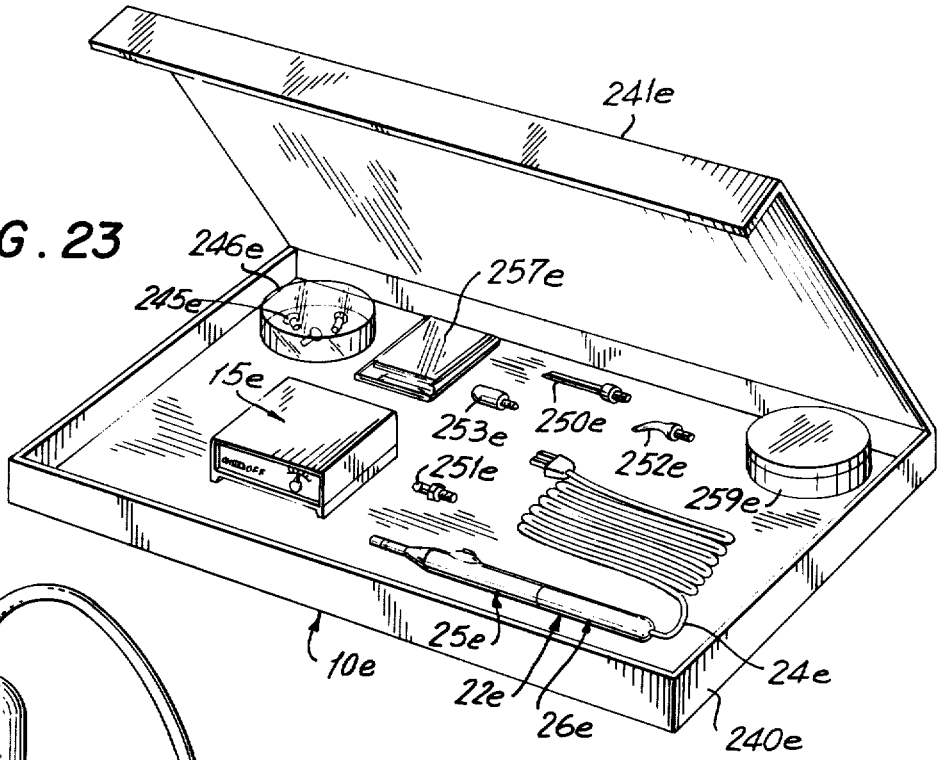
FIG. 23, illustrates another form of hobby kit.
Figure 24:
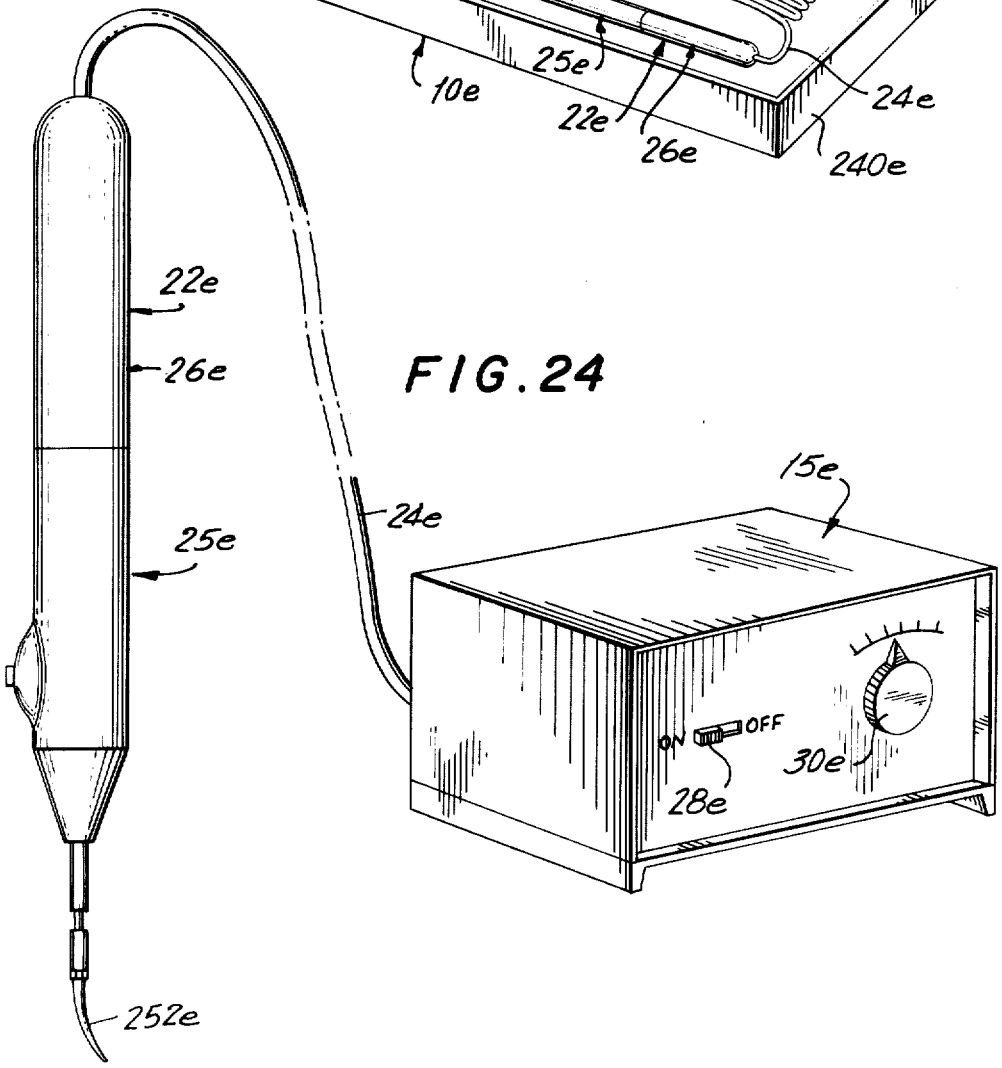
FIG. 24, illustrates the instrument means of the kit in FIG. 23 in assembled relation.

FIGS. 23 and 24 illustrate another form of kit 10e that may be used by the hobbyist to perform a series of applications, some of which are hereinafter illustrated in FIGS. 25–28. In contrast to the kit illustrated in FIG. 19, the present kit as seen in FIG. 23 includes a container 15e that could be battery powered or plugged in a wall outlet and having an on/off switch 28e contained on the cabinet as well as a power control adjustment knob 20e such that the power to perform a special application may be properly adjusted by the user 11e as seen in FIG. 25

The kit includes a converter 15e contained within packaging means or cartion 240e having a cover 241e for shipment. The instrument means 22e is seen to include an adapter 26e having the power cord 24e adapted to be plugged in the convertor 15e as seen in FIG. 24. The accessory 25e is of the type to be removed from the adapter 26e and designed to accept a plurality of interchangeable, removable elements illustrated in the form of a bent or shaped tip 252e, an assembly element 253e for use as seen in FIGS. 25–27, an element 251e which may have a rounded tip, the element 250e which may be in the form of a thin spatula for mixing, welding or other applications.

To facilitate the use of the kit 10e by the user, a number of peripheral items may be provided so that the user, upon purchase of the kit may be able to begin use thereof with what is provided in the kit. For example, the container 246e is provided having a number of clips 245e that may be in the form of plastic or other type fasteners such as illustrated with respect to FIGS. 25–27. In addition, plastic sheet material or even wood members or elements 257e may be provided such as for wood burning or other uses. Container 259e is provided for various plastic or leather strips or filaments to be used for artistic craft work or other uses that the hobbyist may find.

It will be noted that a finger switch is also provided on the accessory 25e such that once the user places the power on by switch 28e the convertor may be in the on position such that instantaneous power will be available at the removable element 252e upon engagement of the finger switch by the user.

FIGS. 25–28 illustrate further usage of the ultrasonic apparatus. At the present time, erector sets normally utilize metallic nuts and bolts to assemble the respective components thereof. As seen with respect to FIG. 25, metallic components 254e and 255e of the erector set are assembled by using a plastic rivet 256e having its head at one end thereof in a nest 258e and the ultrasonic instrument 22e held by the user 11e with a removable element 253e having a pocket for containment of the shaft of the rivet 256e. In this manner the energy is applied with a static force in the direction of the arrows 259e, and the kinetic energy imparted to the rivet by the ultrasonic mechanical vibrations effects the flow of the plastic and a head 260e is formed as seen in FIG. 26.

FIGS. 27 and 28 illustrate a vel fastener adapted to be jointed with ultrasonic energy and including a first fastening element or portion 261e having a head portion 262e in a nest 258e, and a tubular shaft 263e with an axial bore 268e contained therein and a second fastening element 265e having a head portion 266e and a shank shaft 267e adapted to be contained within the axial bore 268e of the shaft 263e. As seen, the two elements 261e and 265e are to be assembled with one head 262e resting in the nest 258e and the second head 266e coupled to the ultrasonic motor tool with ultrasonic vibrations applied thereto by the instrument 22e in the direction of the doubleheaded arrow 269e to assemble parts 254e and 255e. The dimensional relationship between the inner bore 268e and the outer diameter of the shaft 267e is such that there is a minimal spacing of 0.0005 inches for the diameters of the shaft 267e in the range of diameter of 0.032 inch to 1 inch such that a flow of the plastic first occurs to form a molecular bond between the respective circular of other cross-sectional areas of the fastening elements 261e and 265e.

FIG. 28 shows the removal of a head 266e of a rivet, either as formed in FIGS. 25 and 26, or FIG. 27 with an ultrasonic tool 252e that permits the user to quickly disassemble his erector set by shearing off the heads of the plastic rivets and separate the parts 254e and 255e.

Figure 29:
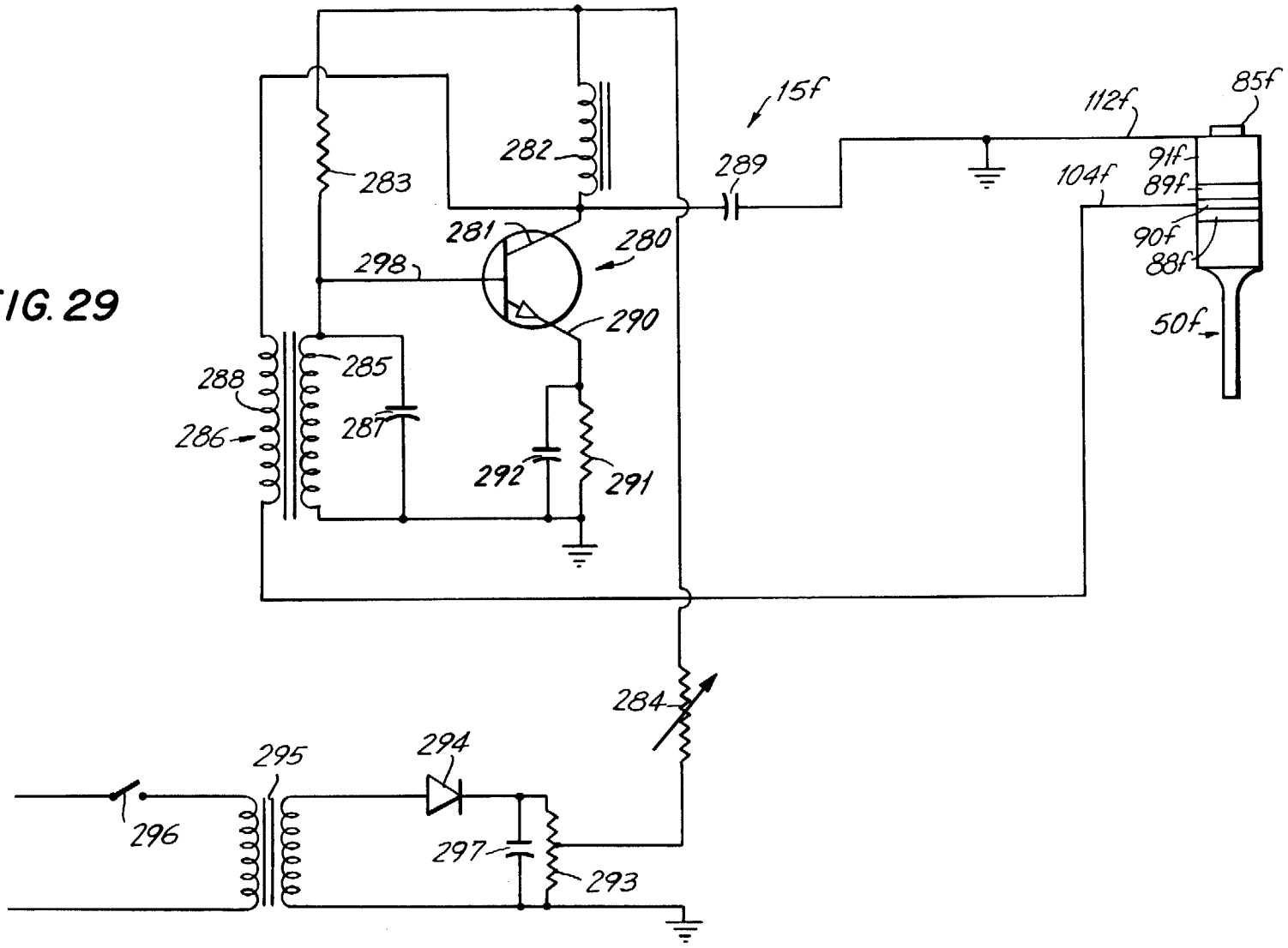
FIGS. 29–32 illustrate various electrical schematics of converters that can be used to drive the various ultrasonic motors described herein.

FIG. 29 illustrates one form of electronic converter circuit 15f that is designed to be used with the type of motor 50f having two crystals 88f and 89f with the electrode 90f therebetween, and generally illustrated in FIGS. 3–6. The motor 50f further includes a rear portion 91f and locking means in the form of a nut 85f with a wire 112f extending from the motor to point of ground or reference potential and a wire 104f extending from the electrode 90f and wired to the converter 15f as hereinafter discussed.

More particularly now, the converter 15f includes a transistor 280 arranged in a driving circuit to provide an output oscillatory signal coupled to the motor 50f to drive or induce ultrasonic vibrations in the piezoelectric crystals 88f and 89f. The transistor 280 which is shown as an N-P-N type, has its collector electrode 281 connected through an R.F. choke 282 to the junction of a fixed value resistor 283 and a variable resistor 284. The other end of the resistor 283 is connected to the base electrode 298 of the transistor 280 and one end of a secondary winding 285 of a transformer 286. The other end of the winding 285 is grounded. A capacitor 287 is connected in parallel with the transformer secondary winding 285 to provide a tank circuit resonant at the desired frequency of oscillation. An output coupling of the developed oscillatory signal is via the transformer primary winding 288 connected between the transistor collector electrode 281 and the motor driving electrode 90f. The collector electrode 281 is coupled to ground through an isolating capacitor 289. The emitter electrode 290 of the transistor 280 is coupled to ground through a bias resistor 291. Resistor 291 is bypassed to ground by a capacitor 292.

D.C. operating power for the oscillator may be provided by a standard type half wave rectifier power supply circuit, as shown for example in FIG. 29 as comprising a resistor 293 in series with a diode 294 and connected across the secondary winding of a transformer 295. A filter capacitor 297 is connected across the resistor 293. The transformer primary is connected through a suitable on-off switch 296 to an A.C. voltage source D.C. voltage is supplied to the oscillator circuit via a lead connection from the variable resistor 284 to a tap on the resistor 293.

Operation of the driving circuit of FIG. 29 is as follows. The variable resistor 284 is adjusted to provide a suitable operating potential for the transistor collector electrode 281. When switch 296 is closed to apply power to the driving circuit, piezoelectric crystals 88f and 89f start oscillating at the desired frequency and a plurality of harmonic and subharmonic frequencies of said desired frequency. These oscillations are applied through transformer primary winding 286 to the resonant tank formed by capacitor 287 and transformer secondary winding 285. This resonant tank is designed so as to pass only the desired frequency and to switch transistor 280 "on" and "off" at said desired frequency. In this manner, a driving signal is applied to crystals 88f and 89f to sustain the oscillations thereof and the ultrasonic vibrations of motor 50f at the desired frequency.

Figure 30:
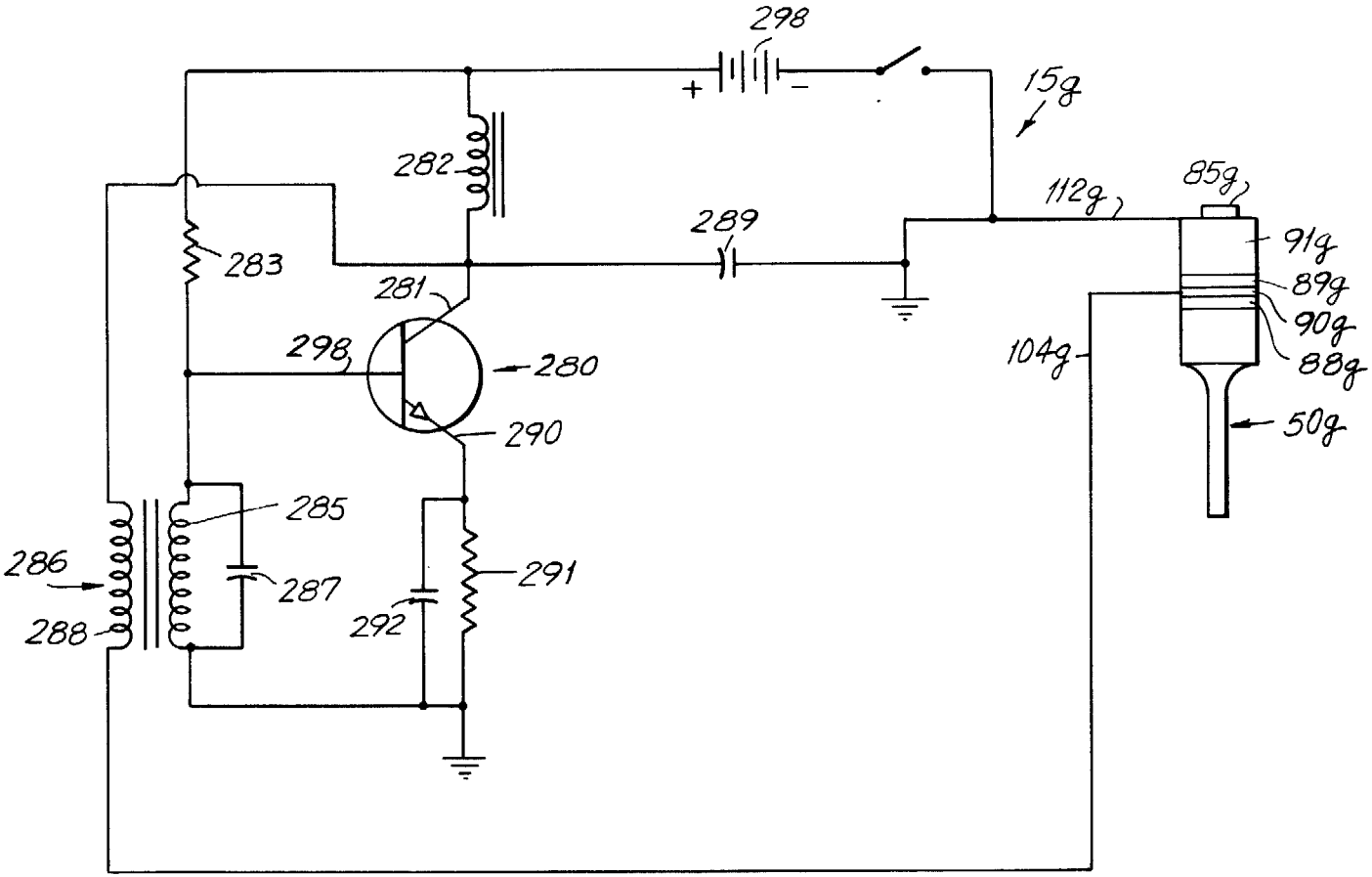

FIG. 30 is similar to FIG. 29 except that in the electronic circuit 15g the A.C. to D.C. power supply circuit has been replaced by a battery 298 or straight D.C. power supply.

Figure 31:
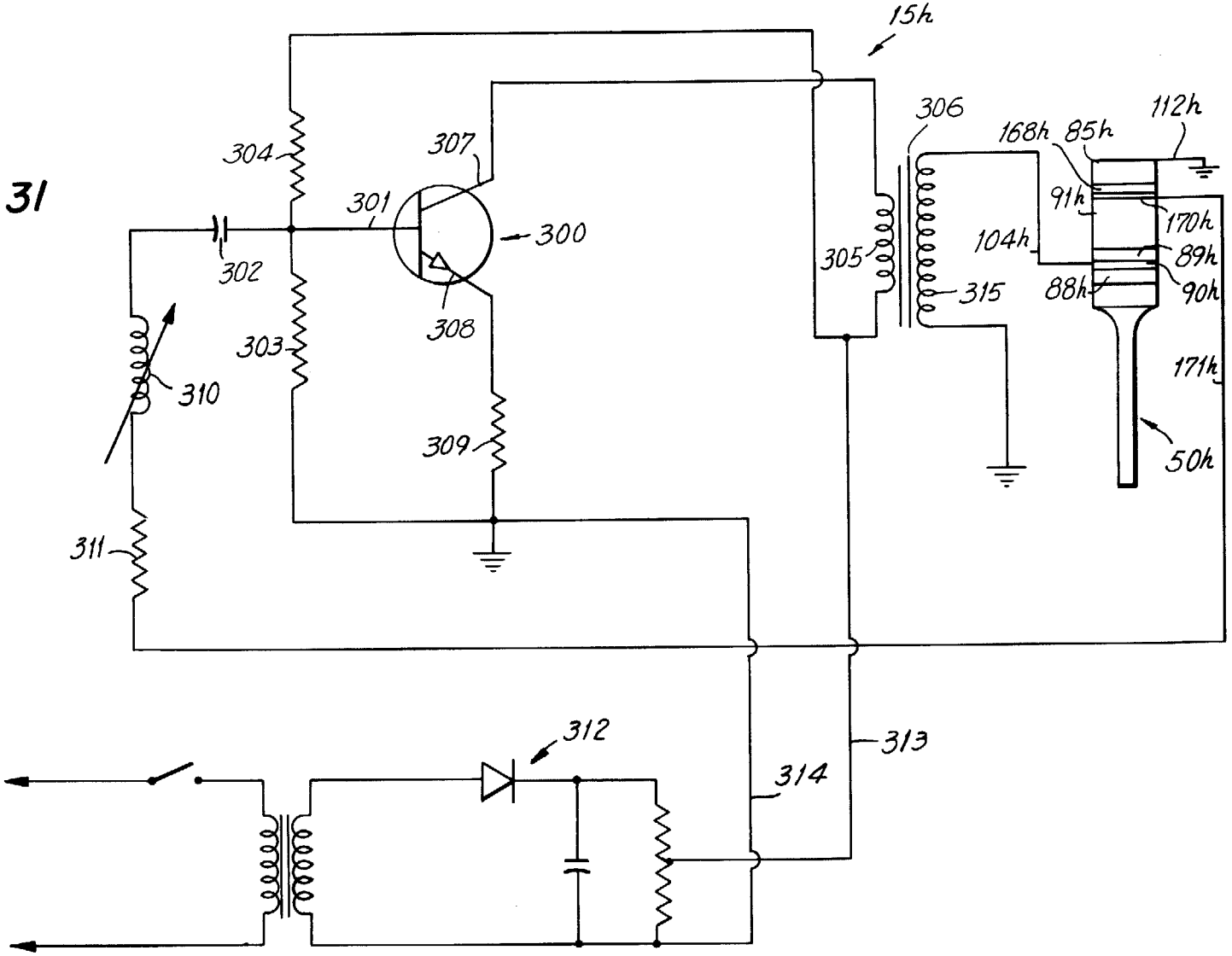

Turning now to FIG. 31, there is illustrated an electronic circuit 15h adapted for use with the ultrasonic motor 50h which may be of the type illustrated in FIGS. 9–18, inclusive, and which includes a pair of driving crystals 88h and 89h, with the electrode 90h therebetween, with a rear member 91h coupled to an electrode 170h and a feedback crystal 168h with a rear locking nut 85h. Electrode 90h is connected by wire 104h to the circuit and electrode 170h by wire 171h. The unit is grounded by wire 112h.

The oscillator circuit for driving the motor 50h includes a transistor 300, having its base electrode 301 connected to the junction of a capacitor 302 and resistors 303 and 304. Resistor 304 is returned via the primary winding 305 of a transformer 306 to the collector electrode 307 of the transistor 300. The emitter electrode 308 of the transistor 300 is connected to ground through a resistor 309. The other end of resistor 303 is also connected to ground. The capacitor 302 is series connected to a variable inductor 310 which is tuned with the capacitor 302 to be series resonant at the desired frequency of vibration for the motor driving crystal 90h. A signal attenuating resistor means 311 series connects the inductor 310 to a feedback crystal 170h in the motor 50h. Operating potential for the circuit is supplied from an A.C. to D.C. power supply 312, similar to that shown in FIG. 29. Connection of the power supply D.C. output voltage to the oscillator circuit is via lead 313 to the transformer primary winding 305 and ground lead 314. The oscillator output drive signal is coupled to the motor 50h and electrode 90h via the transformer secondary winding 315.

Operation of the circuit is as follows:

When the circuit 15h is energized, as by closing of the power supply on-off switch, the sudden surge of current therefrom will drive the crystals 88h and 89h into a vibratory mode of operation. The vibrations of crystal 88h and 89h will in turn induce vibrations in the feedback crystal 168h and the vibrations or oscillatory output of crystal 168h is fed back to the base input of the transistor 300 via the inductor 310 and capacitor 302 network. Since the induced vibrations in the crystal may be harmonic and/or subharmonic of the crystal fundamental frequency, the inductor-capacitor feedback network is turned to be series resonant at the desired frequency of vibration for the motor 50h. The transistor 300 operates as an amplifier so that at this series resonant frequency, the feedback signal to the base input of the transistor 300 will be at a level to provide a sufficient signal output from the transistor 300 for coupling via the transformer 306 to the crystals 88h and 89h to sustain the crystal vibrations at the desired or tuned frequency of the series resonant circuit.

Figure 32:
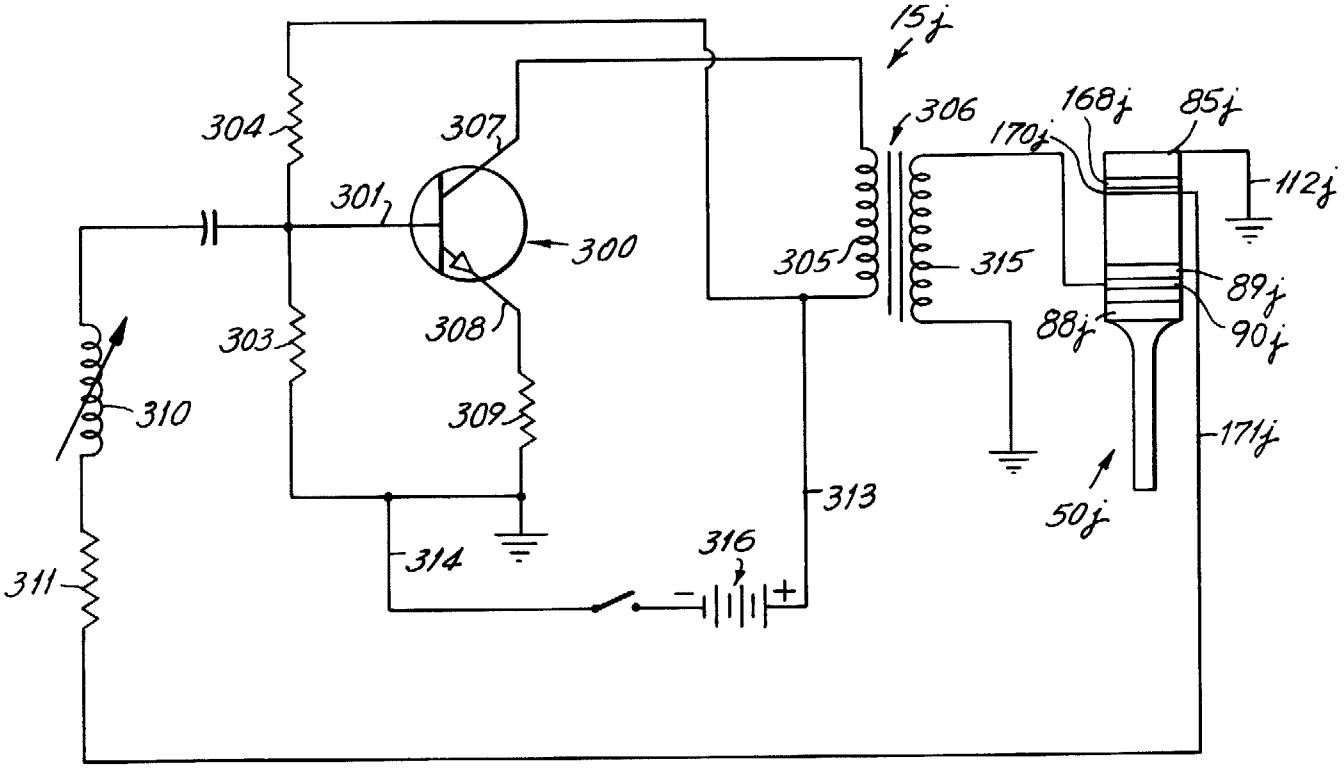

FIG. 32 is similar to FIG. 31 except that in the circuit 15j the A.C. to D.C. power supply circuit has been replaced by a battery 316. Operation of the circuit is the same as was heretofore described with respect to FIG. 31.

CONCLUSION

Applicants have herein disclosed new and novel apparatus and kits to be utilized for the home consumer, professional and industrial markets. The kits of the present invention are multi-functional and provide a major breakthrough into the home consumer field on an economical basis.

Although illustrative embodiments of the invention have been described in detail herein with reference to the accompanying drawing, it is to be understood that the invention is not limited to those precise embodiments, and that various changes and modifications may be effected therein without departing from the scope or spirit of the invention, except as defined in the appended claims.

We claim:

1. An ultrasonic system including

A. a cabinet;

B. driving circuit means for providing an electrical driving signal of a desired ultrasonic frequency including tuned circuit means tuned to said desired frequency for controlling the frequency of said driving signal;

C. adapter means including a first connector coupled to said driving circuit means for transmission of said driving signal;

D. a plurality of means each adapted to be interchangeable with each other and releasably connected to said adapter means and forming part thereof to permit a variety of applications to be performed, said adapter means and interchangeable means when assembled being adapted to be hand held by a user and including:

1. a housing means capable of being hand held, 2. an ultrasonic motor capable of vibration at more than one frequency including said desired frequency mounted within at least a portion of said housing means and having a portion extending outside of said housing means portion for transmission of high frequency mechanical vibrations, said ultrasonic motor including:

a. a transmission member having a rear section and a front section with an output end for transmitting the generated mechanical vibrations, b. transducer means connected to said rear section, said interchangeable means being in the form of an accessory [forming part of said instrument means when assembled therewith and] including said motor, said housing means portion, and a second connector mounted on said housing means portion adapted to be releasably connected to said adapter means first connector for electrically coupling said driving circuit means and said transducer means when in its assembled position through said connectors, E. means for applying to said tuned circuit means a detected signal representative of the frequencies of vibration of said motor, said tuned circuit means responding to the desired frequency portion of said detected signal to cause said driving signal means to produce a driving signal of said desired frequency; and F. a support means associated with said cabinet for holding said assembled adapter means and interchangeable means in fixed position relative to said cabinet when not in use.

2. An ultrasonic system as defined in claim 1, including a plurality of interchangeable elements adapted to be removably secured to said transmission member front section of at least one of said interchangeable means for transmission of the ultrasonic mechanical vibrations.

3. An ultrasonic system defined in claim 1, wherein at least one of said interchangeable means includes a razor connected to said motor for driving said razor at an ultrasonic rate.

4. An ultrasonic system as defined in claim 1, wherein at least one of said interchangeable means includes a toothbrush connected to said motor for driving said toothbrush at an ultrasonic rate.

5. An ultrasonic system as defined by claim 1, wherein at least one of said interchangeable means includes an applicator having a passageway extending therethrough for a stream of liquid and adapted for use in the oral cavity for treating the gingival and tooth structures for hygienic control thereof.

6. An ultrasonic system as defined in claim 1, and further including liquid reservoir means in said cabinet communicating with said adapter means to provide a supply of liquid to the accessory connected to said adapter means.

7. An ultrasonic system as defined in claim 1, wherein

A. said transmission means is elongated, said front section having a smaller cross-sectional area then said rear section to act as an accoustical impedance transformer to amplify the mechanical vibrations transmitted to said rear section and transmitted by said front section, B. said ultrasonic motor including support means extending longitudinally from said rear section, C. said transducer means being piezoelectric, positioned on said support means and electrically connected to said first connector, D. said ultrasonic motor further including a rear member mounted in telescopic relation to said transducer means, and E. locking means to maintain said transmission means, transducer means, and rear member under compression.

8. An ultrasonic system as defined in claim 7, wherein said locking means includes a nut threadably engaged on said support means to compress said transmission means, transducer means and rear member to maintain said compression.

9. An ultrasonic system as defined in claim 8, and further including mounting means for said motor to maintain said motor in fixed position relative to said housing means.

10. An ultrasonic system as defined in claim 7:

a. wherein said transducer means includes a pair of piezoelectric discs mounted on said support means, b. a disc-shaped electrode mounted between said crystal discs, and c. means for insulating said piezoelectric discs and said electrode from said support means.

11. An ultrasonic system as defined in claim 1, wherein said driving circuit means includes a power supply for producing a power signal; switch means for controlling the transmission of said power signal as a driving signal to said transducer means; and transformer means having a primary and a secondary winding; said tuned circuit means including capacitor means connected in parallel with said secondary winding; said means for applying said detected signal including said primary winding and means for electrically coupling said power supply through said primary winding to said transducer means.

12. An ultrasonic system as defined in claim 1, wherein said means for applying said detected signal includes sening means mechanically coupled to said motor for detecting the frequencies of vibration thereof and producing said detected signal, and electrical conductor means for transmitting said detected signal through said first and second connectors to said driving circuit means, said driving circuit means including amplifier means having an input and an outut, said tuned circuit means being connected intermediate said conductor means and said amplifier means input and being adapted to filter said detected signal and pass to said amplifier means input the component of said detected signal of said desired frequency, said driving circuit means further including means operatively coupling said amplifier means output and said first connector for transmission of said driving signal.

13. An ultrasonic system as defined in claim 1, and further including power switching means contained on said housing means and adapted to be engaged by a user during operation of the system.

14. An ultrasonic system as defined in claim 13, wherein said swithcing means is contained on the interchangeable means.

15. An ultrasonic system as defined in claim 13, wherein said switching means is contained on the adapter means.

16. An ultrasonic system as defined in claim 1, and further including electrical coupling means extending between said motor and said second connector, said coupling means being at least in part embedded within said housing means wall and exposed at at least one end thereof to engage said motor to make electrical contact therewith.

17. An ultrasonic kit, including:

A. ultrasonic instrument means adapted to be hand held by the user thereof and having an ultrasonic motor capable of vibrating at more than one frequency;

B. driving circuit means for providing an ultrasonic driving signal of a desired frequency for energizing said ultrasonic instruments means, and adapted to be connected to said motor, said driving circuit means including tuned circuit means tuned to said desired frequency for controlling the frequency of said driving signal;

C. means for applying to said tuned circuit means a detected signal representative of the frequencies of vibration of said motor, said tuned circuit means responding to the desired frequency portion of said detected signal to cause said driving circuit means to produce a driving signal of said desired frequency;

D. interchangeable means each adapted to be removably secured to the front end of said ultrasonic instrument means to permit a variety of applications of ultrasonic mechanical vibrations to selected objects for various results, and E. a container for retaining said ultrasonic instrument means, driving circuit means, and interchangeable means.

18. An ultrasonic kit as defined in claim 17, including electrical plug means for connection to an electrical outlet, said driving circuit means being mounted in said plug means.

19. An ultrasonic kit as defined in claim 17, including a battery for powering said [ converter ] *driving circuit means*, said battery being mounted in said container.

20. An ultrasonic kit as defined in claim 17, and further including plastic parts to be assembled by said ultrasonic instrument means.

21. An ultrasonic kit as defined in claim 20, wherein said plastic parts form a plastic hobby model.

22. An ultrasonic kit as defined in claim 20, wherein said plastic parts are in the form of fasteners.

23. An ultrasonic kit as defined in claim 17, wherein said ultrasonic instrument means includes manual control switch means for selectively actuating said motor.

24. An ultrasonic kit as defined in claim 17, wherein said interchangeable means includes a cutting tool.

25. An ultrasonic kit as defined in claim 17, wherein said interchangeable means includes a heating tool.

26. An ultrasonic kit as defined in claim 17, wherein said driving circuit means includes a power supply for producing a power signal; switch means for controlling the transmision of said power signal as a driving signal to said motor; and transformer means having a primary and a secondary winding; said tuned circuit means including capacitor means connected in parallel with said secondary winding; said means for applying said detected signal including said primary winding and means for electrically coupling said power supply through said primary winding to said motor.

27. An ultrasonic kit as defined in claim 17, wherein said means for applying said detected signal includes sensing means mechanically coupled to said motor and electrically coupled to said driving circuit means for detecting the frequencies of vibration thereof and producing said detected signal, said driving circuit means including amplifier means having an input and an output, said tuned circuit means being connected intermediate said sensing means and said amplifier means input and being adapted to filter said detected signal and pass to said amplifier means input the component of said detected signal of said desired frequency, said driving circuit means further including means operatively coupling said amplifier means output and said motor for transmission of said driving signal.

28. A system for use in the home for hygienic purposes, comprising:

A. a housing adapted to be mounted on a wall in the home having an access opening;

B. a door connected to said housing and adapted to close the access opening and being movable to open the access opening;

C. driving circuit means in said housing for converting conventional home electrical current to an electrical driving signal oscillating at a desired ultrasonic frequency, including tuned circuit means tuned to said desired frequency for controlling the frequency of said driving signal; and D. ultrasonic instrument means in said housing adapted to be hand held by the user, and having an electrical cable connected to said converter, said ultrasonic instrument means being removable through the access opening when said door is opened to permit use of said ultrasonic means with the inner end of the cord being retained within said housing, said instrument means being adapted to be used for hygienic purposes, and having a motor capable of vibrating at more than one frequency including said desired frequency.

29. The system as defined in claim 28, and further including a reel on which said cable is wound to provide retractable means therefore.

30. The system as defined in claim 28, wherein said instrument means includes an adapter having said cable connected thereto and an accessory removably connected to said adapter and having one end thereof for said hygienic purpose, said accessory including:

A. an ultrasonic motor for producing mechanical vibrations;

B. an output section coupled to said motor for transmitting the generated mechanical vibrations;

C. housing means enclosing said motor; [ and ]

D. electrical connecting means mounted on said housing means and connected to said motor, said connecting means being adapted to be releasably connected to said adapter for the transmission of electrical energy to said motor, when in its assembled position [.] *; and*

E. means for applying to said tuned circuit means a detected signal representative of the frequencies of vibration of said motor, said tuned circuit means responding to the desired frequency portion of said detected signal to cause said driving circuit means to produce a driving signal of said desired frequency.

31. A system as defined in claim 30, wherein said accessory is in the form of a razor and includes an ultrasonic motor electrically connected through said adapted to said driving circuit means for driving said razor at the ultrasonic rate.

32. A system as defined in claim 30, wherein said accessory is in the form of a toothbrush and includes an ultrasonic motor electrically connected through said adapter to said driving circuit means, for driving said toothbrush at an ultrasonic rate.

33. The system as defined in claim 30, and further including reservoir means contained in said housing for containing a liquid, said reservoir means being coupled to said cable, said cable and adapter including a passageway to supply liquid to said accessory, and pumping means in communicating relationship to said reservoir means for supplying said liquid to said instrument means, said accessory being in the form of an applicator having a passageway extending therethrough for a stream of liquid and adapted for use in the oral cavity for treating the gingival and tooth structures for hygienic control thereof, said accessory containing an ultrasonic motor electrically connected through said adapter to said driving circuit means to inpart vibratory energy to said applicator.

34. The system as defined in claim 28, and further including power switching means on said instrument means for manual operation by the user during use.

* * * * *